(12) United States Patent
Kashima et al.

(10) Patent No.: US 8,355,203 B2
(45) Date of Patent: Jan. 15, 2013

(54) OPTICAL FUNCTIONAL FILM, RETARDATION FILM, COMPOSITION FOR FORMING OPTICAL FUNCTIONAL LAYER AND PRODUCING METHOD OF OPTICAL FUNCTIONAL FILM

(75) Inventors: Keiji Kashima, Tokyo-to (JP); Kenji Shirai, Tokyo-to (JP); Takashi Kuroda, Tokyo-to (JP); Takeshi Haritani, Tokyo-to (JP)

(73) Assignee: Dai Nippon Printing Co., Ltd., Tokyo-to (JP)

( * ) Notice: Subject to any disclaimer, the term of this patent is extended or adjusted under 35 U.S.C. 154(b) by 0 days.

(21) Appl. No.: 13/173,525

(22) Filed: Jun. 30, 2011

(65) Prior Publication Data
US 2011/0253932 A1 Oct. 20, 2011

Related U.S. Application Data

(63) Continuation of application No. 12/088,260, filed as application No. PCT/JP2006/319281 on Sep. 28, 2006.

(30) Foreign Application Priority Data

Sep. 29, 2005 (JP) ................................. 2005-285678
Sep. 29, 2005 (JP) ................................. 2005-285679
Sep. 29, 2005 (JP) ................................. 2005-285680

(51) Int. Cl.
*G02B 5/30* (2006.01)

(52) U.S. Cl. .................................................. 359/489.01
(58) Field of Classification Search ........................ None
See application file for complete search history.

(56) References Cited

U.S. PATENT DOCUMENTS

| | | | |
|---|---|---|---|
| 6,881,457 B2 * | 4/2005 | Tasaka et al. | 428/1.3 |
| 7,719,643 B2 * | 5/2010 | Kashima et al. | 349/117 |
| 2005/0012883 A1 | 1/2005 | Umeda et al. | |

FOREIGN PATENT DOCUMENTS

| | | |
|---|---|---|
| EP | 1 329 747 A1 | 7/2003 |
| JP | 03-067219 A | 3/1991 |

(Continued)

OTHER PUBLICATIONS

USPTO OA mailed Oct. 18, 2010 in connection with U.S. Appl. No. 12/088,260.

(Continued)

*Primary Examiner* — Derek S Chapel
(74) *Attorney, Agent, or Firm* — Ladas & Parry LLP

(57) ABSTRACT

An optical functional film which exhibits excellent optical characteristics without using an alignment film, and having the excellent adhesion property between layers. The optical functional film includes: a substrate having a property as an optically negative C-plate, and an optical functional layer formed on the substrate and having a rodlike compound. The optical functional layer is formed directly on the substrate, and the rodlike compound forms a random homogeneous alignment in the optical functional layer.

5 Claims, 6 Drawing Sheets

FOREIGN PATENT DOCUMENTS

| | | | |
|---|---|---|---|
| JP | 04-322223 A | | 11/1992 |
| JP | 10-312166 A | | 11/1998 |
| JP | 2000-310780 A | | 11/2000 |
| JP | 2000310780 A | * | 11/2000 |
| JP | 2002-156527 A | | 5/2002 |
| JP | 2002-303722 A | | 10/2002 |
| JP | 2003-207644 A | | 7/2003 |
| JP | 2004-145268 A | | 5/2004 |
| WO | 2004/008197 A1 | | 1/2004 |
| WO | 2005/008303 A1 | | 1/2005 |
| WO | WO 2005008303 A1 | * | 1/2005 |

OTHER PUBLICATIONS

USPTO NOA mailed Apr. 27, 2011 in connection with U.S. Appl. No. 12/088,260.

International Search Report; mailed Dec. 12, 2006; PCT/JP2006/319281.

* cited by examiner

FIG. 3
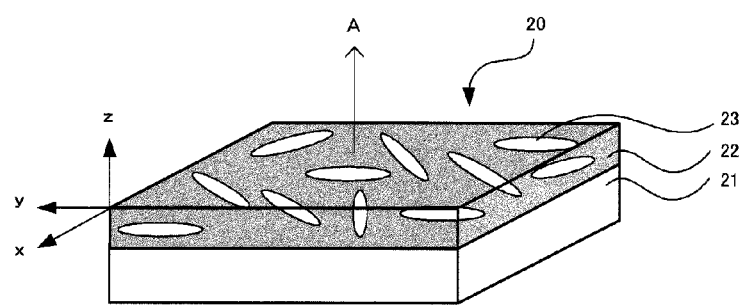
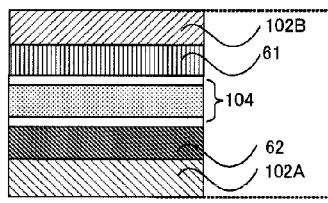
FIG. 4A
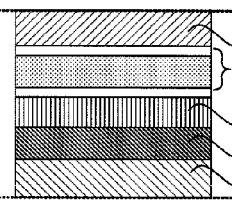
FIG. 4B
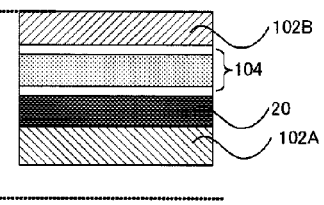
FIG. 4C

OPTICAL FUNCTIONAL FILM, RETARDATION FILM, COMPOSITION FOR FORMING OPTICAL FUNCTIONAL LAYER AND PRODUCING METHOD OF OPTICAL FUNCTIONAL FILM

TECHNICAL FIELD

The present invention relates to an optical functional film to be used in a liquid crystal display, etc. and a producing method of the same. More particularly, the invention relates to an optical functional film which has a novel alignment form of random homogeneous alignment, and exhibits an excellent adhesion property between an optical functional layer and a substrate and excellent optical characteristics.

BACKGROUND ART

Owing to the characteristics of such as power saving, light-weight and thin shape, the liquid crystal displays have recently been spread at a high rate instead of the conventional CRT displays. As a common liquid crystal displays, one comprising incident side polarizing plate 102A, an output side polarizing plate 102E and a liquid crystal cell 104 as shown in FIG. 6 can be presented. The polarizing plates 102A and 102B are provided for selectively transmitting only a linear polarization (shown schematically by the arrow in the figure) having an oscillation plane in a predetermined oscillation direction, disposed in a crossed Nicol state with their oscillation directions perpendicular with each other. Moreover, the liquid crystal cell 104 includes a large number of cells corresponding to the pixels and is disposed between the polarizing plates 102A and 102B.

As the liquid crystal displays, those of various systems have been put into practice according to the alignment form of the liquid crystal molecules comprising the liquid crystal cell. Recently, those of the VA (vertical alignment) system are the mainstream. The liquid crystal displays of the VA system are widely used mainly for the liquid crystal televisions.

As to the liquid crystal cells used for the above-mentioned liquid crystal displays of the VA system, since the liquid crystal molecules are aligned vertically, the liquid crystal cells as a whole has the optical characteristics to function as a positive C-plate. For example, if the liquid crystal cell 104 of the liquid crystal display 100 shown in FIG. 6 has such optical characteristics, a linear polarization transmitted the incident side polarizing plate 102A passes through a cell portion in the non driven state out of the liquid crystal cell 104 without the phase shift so as to be blocked by the output side polarizing plate 102B. On the other hand, at the time of passing through a cell portion in the driven state out of the liquid crystal cell 104, the linear polarization has the phase shift so that a light beam according to the phase shift amount is transmitted and outputted from the output side polarizing plate 102B. Therefore, by optionally controlling the driving voltage of the liquid crystal cell 104 per cell, a desired image can be displayed on the output side polarizing plate 102B side. The liquid crystal display 100 is not limited to those having the light transmission and shielding embodiment mentioned above. A liquid crystal display provided such that a light beam outputted from a cell portion in the non driven state out of the liquid crystal cell 104 is outputted after transmitting through the output side polarizing plate 102B and a light beam outputted from a cell portion in the driven state is shielded by the output side polarizing plate 102B is also proposed.

Considering the case with a linear polarization transmitting a cell portion in the non driven state out of the VA system liquid crystal cell 104 mentioned above, since the liquid crystal cell 104 has birefringence and has different refractive indexes between a thickness direction and an plane direction, although a light beam inputted along the normal line of the liquid crystal cell 104 out of the linear polarization transmitted the incident side polarizing plate 102A is transmitted without the phase shift, a light beam incident in the direction inclined with respect to the normal line of the liquid crystal cell 104 out of the linear polarization transmitted the incident side polarizing plate 102A becomes an elliptical polarization due to the retardation generated at the time of transmitting the liquid crystal cell 104. This phenomenon is caused because the liquid crystal molecules aligned vertically in the liquid crystal cell 104 functions as a positive C-plate. The size of the retardation generated to the light beam transmitted the liquid crystal cell 104 (transmitted light beam) is influenced also by such as the birefringence value of the liquid crystal molecules sealed inside the liquid crystal cell 104, the liquid crystal cell 104 thickness, or the wavelength of the transmitted light beam.

Due to the above-mentioned phenomenon, even in the case with a cell in the liquid crystal cell 104 is in the non driven state and a linear polarization should be transmitted as it is so as to be shielded by the output side polarizing plate 102B, a part of the light beam outputted in the direction inclined with respect to the normal line of the liquid crystal cell 104 is leaked from the output side polarizing plate 102B. Therefore, according to the conventional liquid crystal display 100 as mentioned above, a problem of the deterioration of the display quality of an image observed from the direction inclined with respect to the normal line of the liquid crystal cell 104 compared with an image observed from the front side (viewing angle dependency problem) has been present.

In order to remedy the problem of the viewing angle dependency in the conventional liquid crystal display 100 as mentioned above, a variety of techniques have been developed up to now, and a typical one thereof is a method of using an optical functional film. In the method of using the optical functional film, the problem of the viewing angle characteristics is remedied by disposing an optical functional film 60 having given optical characteristics between a liquid crystal cell 104 and a polarizing plate 102B as shown in FIG. 6. As the optical functional film used to remedy such a problem of the viewing angle characteristics, retardation films exhibiting a refractive index anisotropic property have been used, and have come to be widely used as a means for remedying the viewing angle dependency in the above-mentioned liquid crystal displays.

Heretofore, the above retardation film generally has the construction in which as shown in FIG. 7, an alignment layer 72 is provided on an arbitrary transparent substrate 71 and a retardation layer 73 having liquid crystal molecules is formed on the alignment layer 72, so that the liquid crystal molecules are aligned by an alignment controlling power of the alignment film and thereby a desired refractive index anisotropic property is exhibited. As such retardation films, as disclosed in Patent document 1 or 2, for example, there are retardation films in which a retardation layer having a molecular structure with cholesteric pattern regularity (a retardation film exhibiting birefringence) is formed on a substrate having an alignment layer. Meanwhile, Patent document 3 discloses a retardation film in which a retardation layer composed of a discoid compound (a retardation layer exhibiting birefringence) is formed on a substrate having an alignment layer.

The above retardation films are useful in that the problem of the viewing angle dependency of the liquid crystal display can be largely remedied by appropriately designing the refractive index anisotropic property to offset the retardancy caused in the liquid crystal cell of the liquid crystal display. However, since the conventional retardation film took, as an indispensable component, the alignment layer for aligning the above liquid crystal molecules, there was a problem in the adhesion property between the alignment layer and the retardation layer.

In order to solve this problem, for example, Patent document 4 proposes that the adhesion property is improved by thermally treating liquid crystals and the alignment layer. According to this method, however, when the substrate is not a glass substrate but a substrate having a low wet heat resistance (for example, TAC), it may be that the substrate is expanded or shrunk owing to the influence of moisture. Consequently, this method was hardly said to be a method sufficient for the substrate susceptible to moisture. There was also a problem that interference fringes are formed through multiple reflections between the layers owing to the existence of the alignment layer.

In order to remedy the viewing angle dependency of the liquid crystal display adopting the VA system with use of the alignment film, a method employing two retardation films: a retardation film having a function as a negative C-plate and another having a function as an A plate or B plate is generally used. As the method using such two retardation films, for example, there were used an approach as shown in FIG. 8A in which a liquid crystal cell 104 is sandwiched between a retardation film 61 having a function as the negative C-plate and a retardation film 62 having a function as the A plate, and an approach as shown in FIG. 8B in which a retardation film 61 having a function as the negative C-plate and a retardation film 62 having a function as the A plate are laminated upon an incident side polarizing plate 102A.

The approaches, in which the problem of the viewing angle dependency is remedied by using such two retardation films, is useful in that the problem of the viewing angle dependency can be remedied in liquid crystal display using liquid crystal cells having various optical characteristics, by changing the combination of the retardation films. However, there was a problem in that use of two retardation films thickened the liquid crystal displays or made a producing method complicated.

Meanwhile, as mentioned above, the configuration shown in FIG. 7 is general as the above retardation films. However, the retardation film having such a configuration is useful in that the liquid crystal molecules are likely to be aligned easily owing to the use of the alignment layer, but there was a problem in the adhesion property between the alignment layer and the retardation layer.

To cope with such a problem, the present inventors developed, as a retardation film capable of exhibiting desired optical characteristics without using an alignment film, a retardation film comprising: a substrate, and an optical functional layer which is directly formed on the substrate and has a rodlike compound aligned randomly and homogeneously. Such a retardation film having no alignment film is useful in that the film has excellent adhesion property between the optical functional layer and the substrate and that the optical functional layer having the rodlike compound aligned in the random-homogenous manner mentioned above excellently exhibits the optical characteristics as the negative C-plate. Accordingly, such a retardation film have attracted attention as having the quality exceeding those of the conventional retardation films in terms of the durability and stability in the optical characteristics.

However, the above-mentioned retardation film having no alignment film is formed by coating a composition for forming an optical functional layer containing the above rodlike compound onto the substrate having the property as the negative C-plate. In some cases, it is difficult to form the random-homogenous alignment having a uniform quality with the composition for forming an optical functional layer conventionally used. There was also a problem that the optical functional layer became clouded.

Patent Document 1: Japanese Patent Laid-Open (JP-A) No. H03-67219
Patent Document 2: JP-A No. H04-322223
Patent Document 3: JP-A No. H10-312166
Patent Document 4: JP-A No. 2003-207644

DISCLOSURE OF THE INVENTION

Problems to be Solved by the Invention

The present invention, which has been made in view of the above-mentioned problems, has a main object to provide an optical functional film excellent in display quality that can exhibit excellent optical characteristics without using an alignment film and is excellent in adhesion property between layers.

In addition, another main object of the present invention is to provide a retardation film which has: a property as an optically negative C-plate or a property as an optical A plate or B plate, and the property as the negative-C plate without using an alignment layer.

Moreover, yet another main object of the present invention is to provide a composition for forming an optical functional layer capable of forming an optical functional layer having excellent transparency.

Means to Solve the Problems

To solve the problems, the present invention provides an optical functional film comprising: a substrate having a property as an optically negative C-plate, and an optical functional layer formed on the substrate and having a rodlike compound, characterized in that the optical functional layer is formed directly on the substrate, and the rodlike compound forms a random homogeneous alignment in the optical functional layer.

According to the present invention, since the above optical functional layer is formed directly on the above substrate having the property as the optically negative C-plate, the adhesion force between the substrate and the optical functional layer can be made firm. Therefore, the optical functional film having more excellent adhesion property can be obtained, as compared with the conventional optical functional film having the alignment layer.

Further, according to the present invention, since the rodlike compound forms the random homogeneous alignment in the optical functional layer, the optical functional layer excellently exhibits the refractive index anisotropic property and its transparency can be made high.

In the present invention, the retardation in a thickness direction (Rth) of the above substrate is preferably in a range of 20 nm to 100 nm. This is because, when the retardation in the thickness direction (Rth) of the above substrate is in the above range, it becomes easy to form the random homogeneous alignment in the above optical functional layer irrespective of the kind of the above rodlike compound. Further, when the Rth of the substrate is in the above range, the random homogeneous alignment having a more uniform quality can be formed.

In the above invention, the above substrate is preferably made of triacetyl cellulose. This is because, when the substrate is made of the triacetyl cellulose, the rodlike compound forming the above optical functional layer is readily penetrated into the substrate since the triacetyl cellulose has a molecular structure with relatively bulky side chains. Accordingly, the adhesion property between the substrate and the optical functional layer can be improved. Furthermore, since the triacetyl cellulose is likely to exhibit the property as the optically negative C-plate, the random homogeneous alignment of the rodlike compound is readily formed.

In the present invention, the above rodlike compound preferably has a polymerizable functional group. This is because, when the rodlike compound has the polymerizable functional group, the rodlike compound can be fixed through polymerization. Therefore, the optical functional film which has excellent alignment stability and is unlikely to change the optical characteristics can be obtained by fixing the rodlike compound in such a state that it forms the random homogeneous alignment.

Moreover, in the present invention, the above rodlike compound is preferably a liquid crystalline material. This is because, when the rodlike compound is the liquid crystalline material, the above optical functional layer can exhibit excellent optical characteristics per unit thickness.

In the present invention, the above liquid crystalline material is preferably a material exhibiting a nematic phase. This is because, when the liquid crystalline material is the material exhibiting the nematic phase, the random homogeneous alignment can be more effectively formed.

In the present invention, the thickness of the above optical functional layer is preferably in a range of 0.5 µm to 10 µm. If the thickness of the optical functional layer is larger than the above range, it is difficult in some cases to form the random homogeneous alignment depending upon the kind of the above rodlike compound. If the thickness of the optical functional layer is smaller than the above range, necessary optical characteristics may not be exhibited in the optical functional layer.

The present invention is to provide a retardation film having the retardation in the thickness direction (Rth) of the above optical functional film in a range of 50 nm to 400 nm by using the above optical functional film. According to the present invention, when the above optical functional film is used and the retardation in the thickness direction (Rth) is in the above range, the retardation film suitable for improving the viewing angle characteristics of the liquid crystal display element of the VA (Vertical Alignment) system can be obtained, for example.

In the present invention, the in-plane retardation (Re) is preferably in a range of 0 nm to 5 nm. This is because, when the in-plane retardation (Re) is in the above range, the retardation film of the present invention can be used as a retardation film which is suitable for improving the viewing angle characteristics of the liquid crystal display element of the VA (Vertical. Alignment) system, for example.

Furthermore, in order to solve the above problems, the present invention is to provide a retardation film comprising a substrate having a property of a A plate or a B plate and that of a negative C-plate, and a retardation layer containing a rodlike compound, wherein the retardation layer is formed directly on the substrate, and the rodlike compound forms a random homogeneous alignment in the retardation layer.

According to the present invention, since the retardation layer is formed directly on the substrate having the property of the A plate or the B plate and that of the negative-C plate, adhesion force between the substrate and the retardation layer can be made firm, so that the retardation film having a more excellent adhesion property can be obtained as compared with the conventional retardation layer having the alignment layer.

Further, according to the present invention, since the rodlike compound forms the random homogeneous alignment in the above retardation layer, the retardation layer can be made to excellently exhibit the optical characteristics to function as the negative C-plate. When such a retardation layer is laminated directly on the substrate having the property as the A plate or the B plate and that as the negative C-plate, the retardation film as a whole can exhibit the optical characteristics to function as the A plate or the B plate and the optical characteristics to function as the C plate. Therefore, according to the present invention, the retardation film which contributes to thinning of the liquid crystal display can be obtained.

In the present invention, the in-plane retardation (Re) of the above substrate is preferably in a range of 30 nm to 200 nm. This is because, when the in-plane retardation (Re) of the substrate used in the present invention is in the above range, the retardation film of the present invention can be made to have an excellent property as the A plate.

In the present invention, the retardation in the thickness direction (Rth) of the above substrate is preferably in a range of 10 nm to 150 nm. This is because, when the Rth of the substrate used in the present invention is in the above range, the rodlike compound contained in the above retardation layer can form the random homogeneous alignment having a more uniform quality.

In the present invention, the above substrate is preferably made of a cycloolefin polymer (COP). This is because, since the cycloolefin polymer has low absorbability and permeability of moisture, the temporal stability in the optical characteristics of the retardation film according to the present invention can be made excellent when the substrate used in the present invention is made of the cycloolefin polymer (COP).

In the present invention, the above rodlike compound preferably has a polymerizable functional group. This is because, when the above rodlike compound has the polymerizable functional group, the rodlike compound can be fixed through polymerization. Therefore, the retardation film which has excellent alignment stability and is unlikely to change the optical characteristics can be obtained by fixing the rodlike compound in such a state that it forms the random homogeneous alignment.

Moreover, in the present invention, the above rodlike compound is preferably a liquid crystalline material. This is because, when the rodlike compound is the liquid crystalline material, the above retardation layer can exhibit excellent optical characteristics per unit thickness.

In the present invention, the above liquid crystalline material is preferably a material exhibiting a nematic phase. This is because, when the liquid crystalline material is the material exhibiting the nematic phase, the random homogeneous alignment can be more effectively formed.

In the present invention, the thickness of the above retardation layer is preferably in a range of 0.3 µm to 10 µm. If the thickness of the retardation layer is larger than the above range, it is difficult in some cases to form the random homogeneous alignment depending upon the kind of the above rodlike compound. If the thickness of the retardation layer is smaller than the above range, necessary optical characteristics may not be exhibited in the retardation layer.

The in-plane retardation (Re) of the retardation film of the present invention is preferably in a range of 30 nm to 200 nm. This is because, when the in-plane retardation (Re) is in the above range, it is possible to obtain the retardation film suitable for improving the viewing angle characteristics of the liquid crystal display of the VA (Vertical Alignment) system, for example.

The retardation film of the present invention preferably has the retardation in the thickness direction (Rth) in a range of 50 nm to 300 nm. This is because, when the retardation in the thickness direction (Rth) is in the above range, it is possible to obtain the retardation film suitable for improving the viewing angle characteristics of the liquid crystal display of the VA (Vertical Alignment) system, for example.

Further, in order to solve the above-mentioned problems, the present invention is to provide a composition for forming an optical functional layer comprising: a rodlike compound, and a mixed solvent composed of an alcoholic solvent and another organic solvent, wherein the content of the alcoholic solvent in the mixed solvent is in a range of 5 mass % to 20 mass %.

According to the present invention, when the alcoholic solvent is contained in the above mixed solvent in the above range, the optical functional layer having excellent transparency free from clouding can be formed in case that the optical functional layer is formed by using the composition for forming an optical functional layer of the present invention.

In the present invention, the above composition for forming an optical functional layer is preferably used to form the optical functional layer in which the above rodlike compound forms the random homogeneous alignment. Since the optical functional layer in which the rodlike compound forms the random homogeneous alignment can exhibit the optical characteristics as the negative C-plate even if no alignment film exists, the optical functional layer can be formed on the substrate by coating the composition for forming an optical functional layer of the present invention directly thereon, for example. Thereby, the optical functional layer having an excellent adhesion property to the substrate can be formed.

According to the present invention, the above rodlike compound preferably has a polymerizable functional group. This is because, when the rodlike compound has the polymerizable functional group, the rodlike compound can be fixed through polymerization, so that the optical functional layer having excellent alignment stability and excellent optical characteristics can be formed by using the composition for forming an optical functional layer of the present invention.

Furthermore, in the present invention, the above rodlike compound is preferably a liquid crystalline material. This is because, when the rodlike compound is the liquid crystalline material, the optical functional layer which excellently exhibits the optical characteristics per unit thickness can be formed by using the composition for forming an optical functional layer.

Further, in the present invention, the above liquid crystalline material is preferably a material exhibiting the nematic phase. This is because, when the liquid crystalline material is the material exhibiting the nematic phase, the optical functional layer, in which the rodlike compound forms the random homogeneous alignment having a more uniform quality, can be formed by using the composition for forming an optical functional layer of the present invention.

The present invention further provides a producing method of an optical functional film, comprising: a substrate having a property as a negative C-plate, and the composition for forming an optical functional layer, characterized in that the composition for forming an optical functional layer is coated onto the substrate to produce an optical functional film comprising the substrate, and the optical functional layer formed directly on the substrate and containing the rodlike compound forming the random homogeneous alignment.

According to the present invention, when the optical functional layer is formed by using the above composition for forming an optical functional layer, the optical functional film having the optical functional layer with excellent transparency can be produced.

Further, when the optical functional layer is formed directly on the substrate, the optical functional film having an excellent adhesion property between the optical functional layer and the substrate can be produced.

In addition, since the above rodlike compound forms the random homogeneous alignment in the optical functional layer of the optical functional film produced by the present invention, the optical functional film produced by the present invention can be made to excellently exhibit the optical characteristics, especially the optical characteristics to function as the negative C-plate.

Effects of the Invention

The present invention exhibits effects that the optical functional film can be obtained, which exhibits the excellent optical characteristics without using the alignment film and has the excellent adhesion property between the optical functional layer and the substrate.

Moreover, the present invention exhibits effects that the retardation film can be obtained without using the alignment film, which exhibits, in a single film, the optical characteristics to function as the optically negative C-plate or to function as the optical A plate or B plate and the negative C-plate, and which has the excellent adhesion property between the retardation layer and the substrate.

Further, the composition for forming an optical functional layer of the present invention exhibits an effect that the optical functional layer having excellent transparency can be formed.

BRIEF DESCRIPTION OF THE DRAWINGS

FIG. 3 is a schematically sectional view showing a further another embodiment of the optical functional film of the present invention.

FIGS. 4A to 4C are each a schematically sectional view showing one example of a use embodiment of the optical functional film of the present invention.

EXPLANATION OF REFERENCES

| | |
|---|---|
| 1 | substrate |
| 2 | optical functional layer |
| 3 | rodlike compound |
| 10 | optical functional film |
| 21 | substrate |
| 22 | retardation layer |
| 23 | rodlike compound |
| 20 | retardation film |
| 30, 40 | polarizing plate |
| 51 | film for protecting a polarizing plate |
| 52 | polarizer |
| 60, 61, 62 | retardation film |
| 71 | substrate |
| 72 | alignment layer |
| 73 | retardation layer |
| 100 | liquid crystal display |
| 102A, 102B | polarizing plate |
| 104 | liquid crystal cell |

BEST MODE FOR CARRYING OUT THE INVENTION

In the following, the optical functional film, the retardation film, the composition for forming an optical functional layer and the producing method of an optical functional film according to the present invention will be explained in detail.
A. Optical Functional Film First, the optical functional film of the present invention will be explained. The optical functional film of the present invention comprises: a substrate having a property as an optically negative C-plate, and an optical functional layer formed directly on the substrate and having a rod-like compound, wherein the optical functional layer is formed directly on the substrate, and the rodlike compound forms a random homogeneous alignment in the optical functional layer.

Figure 1:
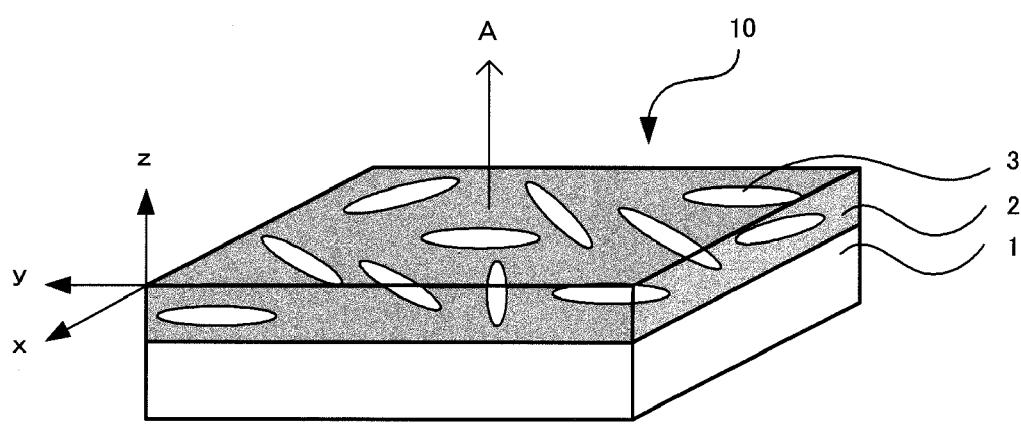
FIG. 1 is a schematically perspective view showing one embodiment of the optical functional film of the present invention.
Figure 7:
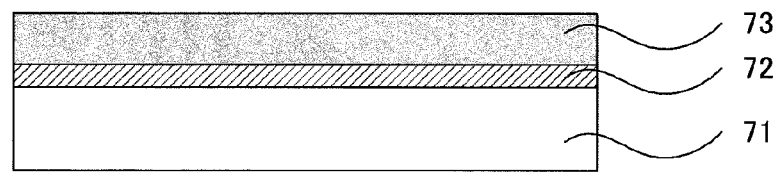
FIG. 7 is a schematically sectional view showing one example of the conventional retardation film.
Figure 8A:
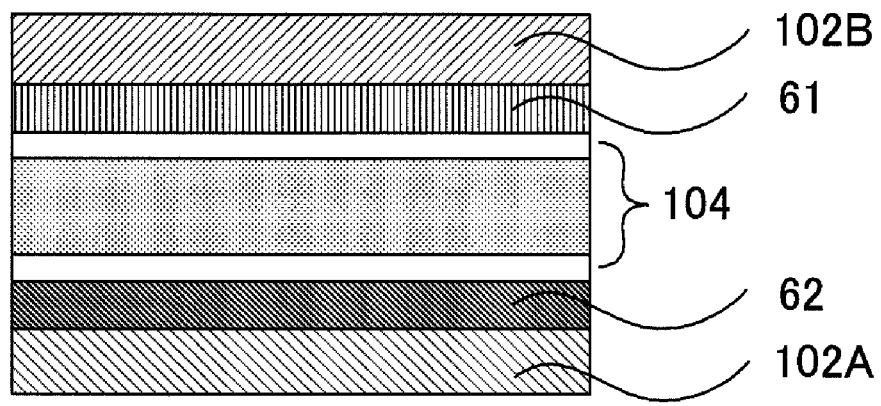
FIGS. 8A and 8B are each a schematically sectional view showing one example of the liquid crystal display using two retardation films.
Figure 8B:
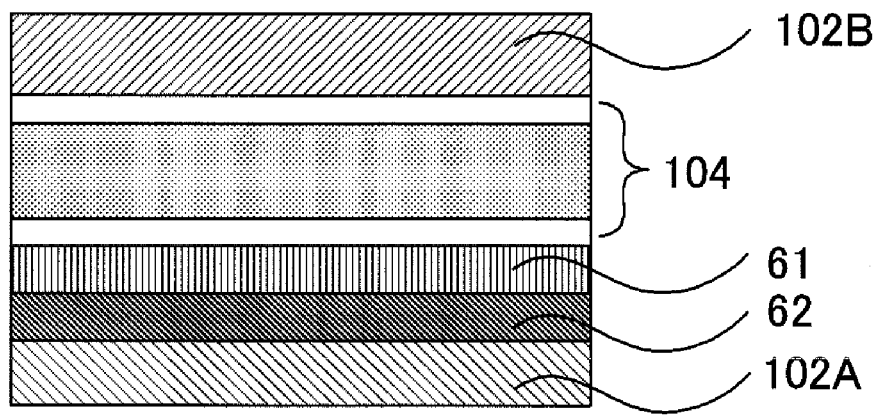

Next, the optical functional film according to the present invention will be explained with reference to the drawings. FIG. 1 is a schematically perspective view of one embodiment of the optical functional film of the present invention. As shown in FIG. 1, the optical functional film 10 of the present invention comprises a substrate 1 and an optical functional layer 2 formed directly on the substrate 1. In the optical functional film 10 of the present invention, the substrate 1 has the property as the optically negative C-plate, and the optical functional layer 2 contains the rod-like compound 3 which forms a random homogeneous alignment. As shown in FIG. 1, the optical functional film 10 of the present invention has the configuration that the optical functional layer 2 is formed directly on the substrate 1 and that the film does not have the alignment layer as the indispensable constituent element unlike the conventional optical film as shown in FIG. 7.

Since the optical functional layer is formed directly on the substrate in the optical functional film according to the present invention as illustrated in FIG. 1, the substrate can be firmly adhered to the optical functional layer, so that the film has a merit that no delamination or the like will occur with lapse of time. Further, with improvement in the adhesion property, the optical functional film has merits, for example, that the alkaline resistance and reworkability are improved.

It is considered that the formation of the optical functional layer directly on the substrate like this improves the adhesion force between them through the following mechanism. That is, since the formation of the optical functional layer directly on the substrate enables the rod-like molecules contained in the optical functional layer to be penetrated into the substrate from the surface thereof, there is no clear interface at a bonding portion between the substrate and the optical functional layer, and the bonding portion is in a "mixed" state of them. Thus, it is considered that the adhesion property is conspicuously improved owing to this as compared with the bonding through the conventional interface interaction.

In addition, the conventional optical functional film with the alignment layer has the problem that light undergoes multiple reflections in the interface between the alignment layer and the optical functional layer and the interface between the alignment layer and the substrate to cause interference fringes. However, according to the optical functional film of the present invention, there is no clear interface, because the film has no alignment layer as mentioned above and the bonding portion between the substrate and the optical functional layer is in the "mixed" state. Therefore, the film has the merits that the above multiple reflections do not occur and therefore, the deterioration in quality does not occur owing to the interference fringes.

Next, the random homogeneous alignment in the present invention will be explained. The random homogeneous alignment in the present invention is an alignment state which is formed by the rodlike compound contained in the above optical functional layer. Since the rodlike compound has such an alignment state, the optical characteristics of the optical functional film of the present invention can be made excellent.

The random homogeneous alignment of the rodlike compound in the present invention has at least three features as mentioned below. That is, the random homogeneous alignment in the present invention has at least following three features:

first, when the optical functional layer is viewed just from the vertical direction to the surface of the optical functional layer, the alignment directions of the rodlike compounds are random (hereinafter, it may be referred to simply as "irregularity");

second, sizes of domains formed by the rodlike compounds in the optical functional layer are smaller than the wavelengths in the visible light zone (hereinafter, it may be referred to simply as "dispersibility"); and third, the rodlike compounds are aligned in-plane in the optical functional layer (hereinafter, it may be referred to simply as "in-plane alignment properties").

Figure 2A:
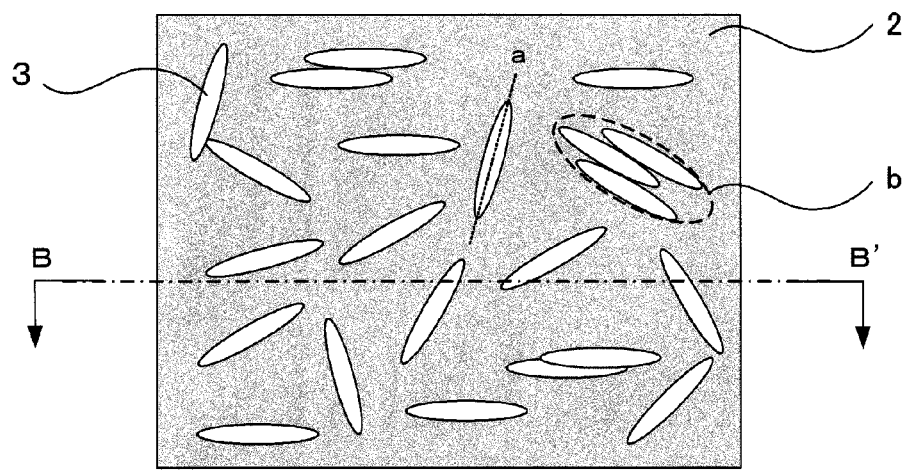
FIGS. 2A to 2C are each a schematically sectional view showing another embodiment of the optical functional film of the present invention.
Figure 2B:
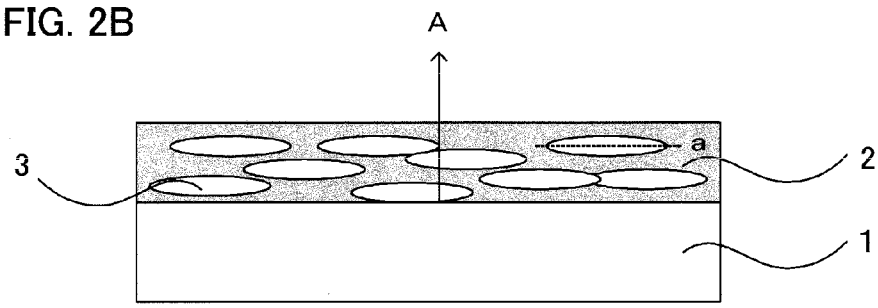
Figure 2C:
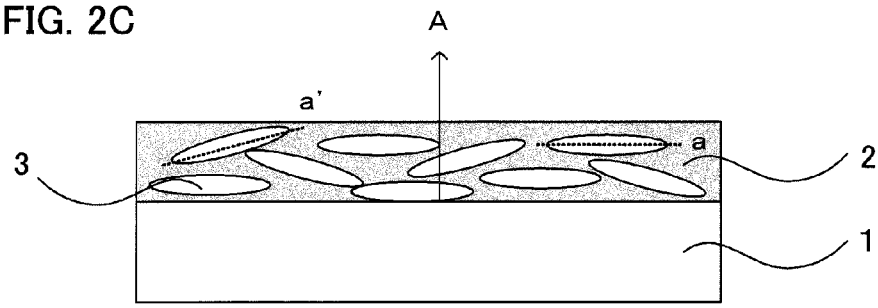

Next, such a random homogeneous alignment in the present invention will be explained with reference to the drawings. FIG. 2A is a schematic view in which the optical functional film according to the present invention is viewed just from that vertical direction to the surface of the optical functional layer which is shown by A in FIG. 1 mentioned above. Meanwhile, FIGS. 2B and 2C are each a sectional view from B-B' linear arrows in FIG. 2A.

First, "irregularity" possessed by the random homogeneous alignment in the present invention will be explained with reference to FIG. 2A. The "irregularity" means that when the optical functional film 10 of the present invention is viewed just from the vertical direction to the surface of the optical functional layer 2 as shown in FIG. 2A, the rodlike compounds 3 is aligned randomly in the optical functional layer 2.

Here, when the alignment directions of the rodlike compound 3 are to be explained in the present invention, the long-axis direction of the molecule (hereinafter, referred to as "molecular axis) shown by "a" in FIG. 2A is considered as a reference. Therefore, that the alignment directions of the rodlike compounds are random means that the molecular axes "a" of the rodlike compound 3 contained in the optical functional layer are directed randomly.

When the rodlike compound has a cholesterolic structure other than the sequence state illustrated in FIG. 2A, this formally corresponds to the "irregularity", because the directions of the molecular axes "a" are random as a whole. However, the state resulting from the cholesterolic structure is not included in the "irregularity" in the present invention.

Next, the "dispersibility" possessed by the random homogeneous alignment in the present invention will explained with reference to FIG. 2A. The "dispersibility" means that when a domain "b" is formed by the rodlike compound 3 in the optical functional layer 2 as shown in FIG. 2A, the size of the domain "b" is smaller than the wavelengths in the visible light zone. In the present invention, the smaller the size of the domain "b", the more preferable it is. It is the most preferable that the rodlike compounds are dispersed in a single molecular state.

The "in-plane alignment properties" possessed by the random homogeneous alignment in the present invention will be explained with reference to FIG. 2B. The "in-plane alignment properties" means that as shown in FIG. 2B, the rodlike compounds 3 aligns the molecular axes "a", in the optical functional layer 2, substantially vertical to the normal direction A of the optical functional layer 2. The "in-plane alignment properties" in the present invention not only means the case where as shown in FIG. 2B, the molecular axes "a" of all the rodlike compound 3 in the optical functional layer 2 are substantially vertical to the normal direction A, but also it includes a case where even if there are rodlike compound 3 of which molecular axes "a'" are not vertical, in the optical functional layer 2, to the normal direction A as shown in FIG. 2C, the average direction of the molecular axes "a" of the rodlike compound 3 existing in the optical functional layer 2 are substantially vertical to the normal direction A.

According to the optical functional film of the present invention, since the above rodlike compound forms the random homogeneous alignment, the relation: nx=ny>nz is realized among a refractive index "nx" in an x-direction, a refractive index "ny" in a y-direction and a refractive index "nz" in a z-direction shown in FIG. 1. The optical functional film of the present invention can be favorably used as the retardation film having the property as the negative C-plate.

As explained above, the random homogeneous alignment in the present invention is featured by exhibiting at least "irregularity", "dispersibility" and "in-plane alignment properties". That the optical functional film of the present invention possesses these features can be confirmed by the following methods.

First, a method for confirming the "irregularity" possessed by the random homogeneous alignment in the present invention will be explained. The "irregularity" can be confirmed by evaluating the in-plane retardation (Re) of the optical functional layer constituting the optical functional film of the present invention and by evaluating whether a selective reflection wavelength resulting from the cholesterolic structure exists or not.

That is, that the rodlike compound is aligned randomly can be confirmed by evaluating the Re of the optical functional layer constituting the optical functional film of the present invention, and that the rodlike compounds do not form the cholesterolic structure can be confirmed by based on whether the selective reflection wavelength exists or not.

That the above rodlike compounds are aligned randomly can be confirmed by ascertaining that the value of the in-plane retardation (Re) of the optical functional layer in the range showing that the rodlike compound is in the random alignment. Particularly, in the present invention, the in-plane retardation (Re) of the optical functional layer is preferably in a range of 0 nm to 5 nm. Here, the Re is a value expressed by a formula: Re=(Nx−Ny)×d in which Nx and Ny are respectively a refractive index in the leading phase axis direction (the direction with the smallest refractive index) and a refractive index in the lagging phase axis direction (the direction with the largest refractive index) in the plane of the optical functional layer constituting the optical functional film of the present invention, and "d" is the thickness (nm) of the optical functional layer in the plane of the retardation layer constituting the optical functional film of the present invention.

Here, that the above rodlike compound is in the random alignment can be confirmed by the Re for the following reason. That is, as is clear from the above definition formula, Re is a parameter showing a difference between the refractive indexes in the in-plane directions. When the rodlike compounds are aligned regularly in one direction in the optical functional layer, the above refractory index difference tends to increase, because the refractive index becomes greater in a specific direction. On the other hand, when the rodlike compound is in the random alignment, the above refractive index difference tends to decrease, because the refractive index in a specific direction inside the plane of the optical functional layer does not increase. Therefore, the "irregularity" can be evaluated by estimating the Re which denotes such a refractive index difference.

For example, the Re of the above optical functional layer can be determined by subtracting the Re indicated by other layer(s) than the optical functional layer from the Re of the optical functional film. That is, the Re of the optical functional layer can be determined by measuring the Re of the entire optical functional film and the Re of a remainder in which the optical functional layer is removed from the optical functional film, and subtracting the latter Re from the former Re. For example, Re can be measured by a parallel Nicol rotation method with use of KOBRA-WR manufactured by Oji Scientific Instruments.

That the above rodlike compound has no cholesterolic structure can be evaluated by confirming that the optical functional layer in the present invention has no selective reflection wavelength, with use of a UV-VIS-NIR spectrophotometer (UV-3100 or the like) manufactured by Shimadzu Corporation. For, when the rodlike compound takes the cholesterolic structure, it is characterized in that it has the selective reflection wavelength depending upon the spiral pitch of the cholesterolic structure.

Next, a method for confirming the "dispersibility" possessed by the random homogeneous alignment in the present invention will be explained. The "dispersibility" can be confirmed by ascertaining that the haze value of the optical functional layer constituting the optical functional film of the present invention is in a range denoting that the sizes of the domains of the above rodlike compounds are not more than the wavelengths in the visible light zone. Particularly, in the present invention, the haze value of the optical functional layer is preferably in a range of 0% to 5%.

Here, the haze value of the optical functional layer can be determined by subtracting the haze value of the other layer(s) than the optical functional layer from that of the optical functional film, for example. That is, the haze value of the optical functional layer can be determined by measuring the haze value of the entire optical functional film and that of a remainder in which the optical functional layer is removed from the optical functional film, and subtracting the latter haze value from the former haze value. A value measured according to JIS K7105 is used as the above haze value.

Here, that the "dispersibility" is possessed or that the sizes of the domains formed by the rodlike compounds are smaller than the wavelengths in the visible light zone is to be confirmed by the haze for the following reason. That is, if the rodlike compound forms a domain and the size of the domain is greater than the wavelength of the visible light, the optical functional layer tends to be clouded, because the visible light is scattered in the above optical functional layer. Therefore, the "dispersibility" can be evaluated by measuring the haze of the optical functional layer in the visible light zone.

The concrete size of the above domain in the present invention is preferably not more than the wavelengths of the visible lights, that is, not more than 380 nm, more preferably not more than 350 nm, and particularly preferably not more than 200 nm. In the present invention, note that since the rodlike compound is dispersed in the form of single molecules, the lower limit of the above domains is that of the single molecule of the rodlike compound. The size of such a domain can be evaluated by observing the optical functional layer with a polarization microscope, an AFM, an SEM or a TEM.

Next, a method for confirming the "in-plane alignment properties" possessed by the random homogeneous alignment in the present invention will be explained. The "in-plane alignment properties" can be confirmed by ascertaining that the Re value of the optical functional layer constituting the optical functional film of the present invention is in the above-mentioned range and that the optical functional layer in the present invention has the retardation value in the thickness direction (Rth), which denotes the property as the optically negative C-plate. Particularly, the retardation in the thickness direction (Rth) of the optical functional layer in the present invention is preferably in a range of 50 nm to 400 nm. Here, the Rth value is a retardation value in the thickness direction, which is represented by a formula: $Rth=\{(Nx+Ny)/2-Nz\} \times d$ in which Nx and Ny are respectively a refractive index in the leading phase axis direction (the direction with the smallest refractive index) and a refractive index in the lagging phase axis direction (the direction with the largest refractive index) in the plane of the optical functional layer constituting the optical functional film of the present invention, Nz is a refractive index in the thickness direction, and "d" is the thickness (nm) of the optical functional layer. Here, the Rth in the present invention denotes an absolute value of that represented by the above formula.

Here, that the rodlike compound possesses the "in-plane alignment properties" can be confirmed by the Re and the Rth for the following reason. That is, as is clear from the above definition formula, Rth is a parameter resulting from a difference between the average value of the refractive indexes in the in-plane directions and the refractive index in the thickness direction. As mentioned above, since the Re value of the optical functional layer gives a value in a certain range from the "irregularity", the Rth value depends upon the refractive index (Nz) in the thickness direction. Here, since the refractive index in the thickness direction (Nz) tends to decrease because of the in-plane alignment of the rodlike compound, the Rth value tends to increase in this case. Therefore, the "in-plane alignment properties" can be evaluated when the Rth value of the optical functional layer is in the above range.

The Rth of the above optical functional layer can be determined by subtracting the Rth denoted by the other layer(s) than the optical functional layer from the Rth of the optical functional film, for example. That is, the Rth of the optical functional layer can be determined by measuring the Rth of the entire optical functional film and the Rth of a remainder in which the optical functional layer is removed from the optical functional film, and subtracting the latter Rth from the former Rth. The Rth can be measured by the parallel Nicol rotation method with use of the KOBRA-WR manufactured by Oji Scientific Instruments.

As mentioned above, the optical functional film according to the present invention comprises the substrate and the optical functional layer formed directly on the substrate. In the following, the configuration of such an optical functional film of the present invention will be explained in detail.

1. Optical Functional Layer

First, the optical functional layer constituting the optical functional film of the present invention will be explained. The optical functional layer in the present invention is formed directly on the below-mentioned substrate. When the optical functional layer in the present invention is directly formed on the substrate like this, it can be firmly adhered to the substrate. In addition, the optical functional layer in the present invention contains the rodlike compound, and the rodlike compound forms the random homogeneous alignment. Since such a rodlike compound forms the random homogeneous alignment, excellent optical characteristics can be exhibited in the optical functional film of the present invention without the alignment layer. In the following, such an optical functional layer will be explained in detail.

(1) Rodlike Compound

The rodlike compound used in the present invention will be explained. The rodlike compound used in the present invention is not particularly limited, so long as it can form the random homogeneous alignment in the optical functional layer.

Here, the "rodlike compound" in the present invention means a compound in which a main skeleton of the molecular structure is rod-like. As the compound having such rod-like main skeletons, mention may be made of azomethin compounds, azoxy compounds, cyanobiphenyl compounds, cyanophenyl esters, benzoic acid esters, cyclohexane carboxylic acid phenyl esters, cyanophenyl cyclohexanes, cyano-substituted phenyl pyrimidines, alkoxy-substituted phenyl pyrimidines, phenyl dioxanes, tolans, and alkenylcyclohexyl benzonitriles. Further, not only the above low-molecular liquid crystalline compounds but also high-molecular liquid crystalline compounds can be used.

As the rodlike compound used in the present invention, a compound having a relatively small molecular weight is favorably used. More specifically, a compound having a molecular weight in a range of 200 to 1200, particularly in a range of 400 to 800 is favorably used. This is because, when the molecular weight is in the above range, the rodlike compound is likely to be penetrated into the substrate mentioned later. Consequently, a "mixed" state is likely to be formed at the bonding position between the substrate and the optical functional layer, and the adhesion property between the substrate and the optical functional layer can be improved.

As to the above-mentioned molecular weight concerning the rodlike compound being a material having a polymerizable functional group to be described later, it refers to the molecular weight before the polymerization.

Moreover, it is preferable that the rodlike compound used in the present invention is a liquid crystalline material showing the liquid crystalline property. Since the rodlike compound is a liquid crystalline material, the above optical functional layer can be provided with the excellent optical characteristic realizing property per unit thickness. Moreover, it is preferable that the rodlike compound used in the present invention is a liquid crystalline material showing the nematic phase among the liquid crystalline materials. A liquid crystalline material showing the nematic phase can form a random homogeneous alignment relatively easily.

Furthermore, it is preferable that the above liquid crystalline material showing the nematic phase is a molecule having a spacer on both ends of the mesogen. Since a liquid crystalline material having a spacer on both ends of the mesogen has the excellent flexibility, clouding of the optical functional layer in the present invention can effectively be prevented.

As the rodlike compound used in the present invention, those having a polymerizable functional group in a molecule can be used preferably. In particular, those having a three-dimensionally cross-linkable polymerizable functional group are preferable. Since the rodlike compound has a polymerizable functional group, the rodlike compound can be fixed by the polymerization. By fixing the rodlike compound in a state where the random homogenous alignment is formed, an optical functional film having the sequence stability and having difficulty in causing changes in optical characteristics can be obtained. In the present invention, the above-mentioned rodlike compound having a polymerizable functional group and the above-mentioned rodlike compound not having a polymerizable functional group can be used as a mixture.

The "three-dimensional cross-linking" mentioned above denotes to three-dimensionally polymerize the liquid crystalline molecules with each other so as to be in a mesh-like (network) structure state.

As the polymerizable functional group, various polymerizable functional groups to be polymerized by the function of the ionizing radiation such as the ultraviolet ray and the electron beam, or the heat can be used without particular limitation. As the representative examples of these polymerizable functional groups, a radically polymerizable functional group, or a cation polymerizable functional group can be presented. Furthermore, as the representative examples of the radically polymerizable functional group, a functional group having at least one addition polymerizable ethylenically unsaturated double bond can be presented. As the specific examples, a vinyl group having or not having a substituent, or an acrylate group (the general term including an acryloyl group, a methacryloyl group, an acryloyloxy group, and a methacryloyloxy group) can be presented. Moreover, as the specific examples of the cation polymerizable functional group, an epoxy group, or the like can be presented. Additionally, as the polymerizable functional group, for example, an isocyanate group or an unsaturated triple bond can be presented. Among these examples, in terms of the process, a functional group having an ethylenically unsaturated double bond can be used preferably.

As the rodlike compound in the present invention, a liquid crystalline material showing the liquid crystalline property, having the above-mentioned polymerizable functional group on the end is particularly preferable. For example, by using a nematic liquid crystalline material having a polymerizable functional group on the both ends, a mesh-like (network) structure state can be provided by the three-dimensional polymerization with each other so as to obtain an optical functional layer having the sequence stability and excellent optical characteristic realizing properties. Moreover, even in the case of one having a polymerizable functional group on one end, it can have the sequence stability by cross-linking with the other molecules. As such a rodlike compound, the compounds represented by the following formulae (1) to (6) can be presented.

[Chemical formula 1]

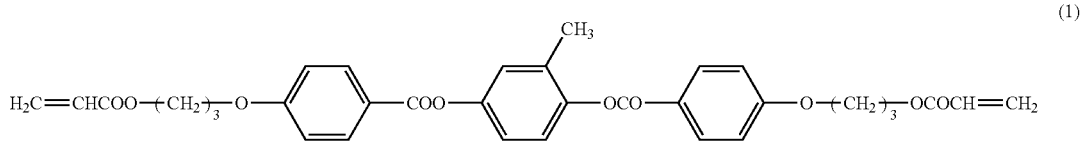

(1)

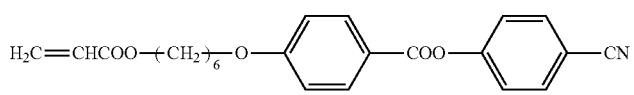

(2)

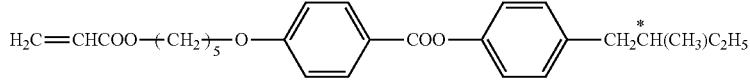

(3)

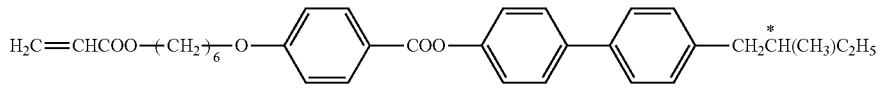

(4)

(5)

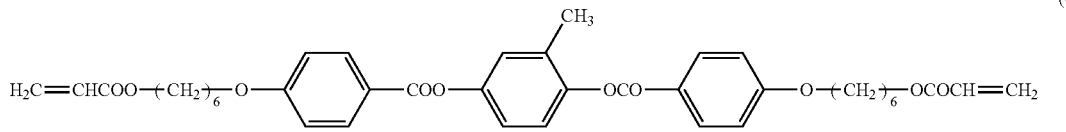

(6)

Here, the liquid crystalline materials represented by the chemical formulae (1), (2), (5) and (6) can be prepared according to the methods disclosed by D. J. Broer et, al., Makromol. Chem. 190, 3201-3215 (1989), or by D. J. Broer et, al., Makromol. Chem. 190, 2250 (1989), or by a similar method. Moreover, preparation of the liquid crystalline materials represented by the chemical formulae (3) and (4) is disclosed in DE 195,04,224.

Moreover, as the specific examples of the nematic liquid crystalline material having an acrylate group on the end, those represented by the following chemical formulae (7) to (17) can also be presented.

[Chemical formula 2]

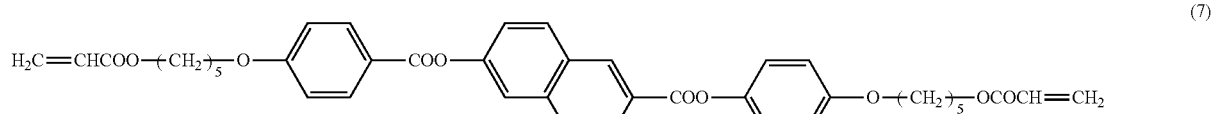
(7)

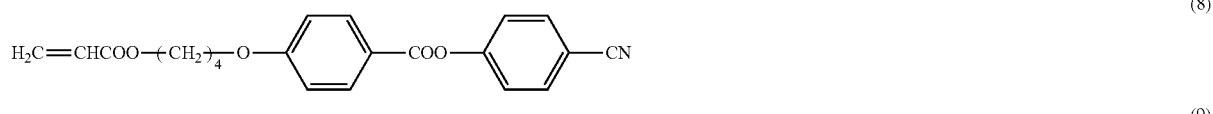
(8)

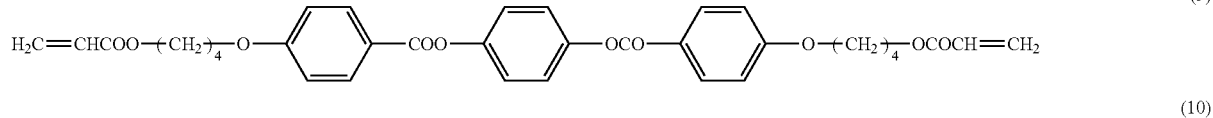
(9)

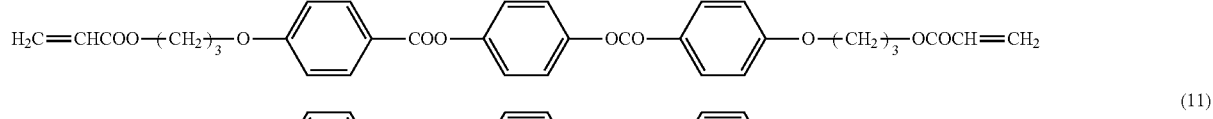
(10)

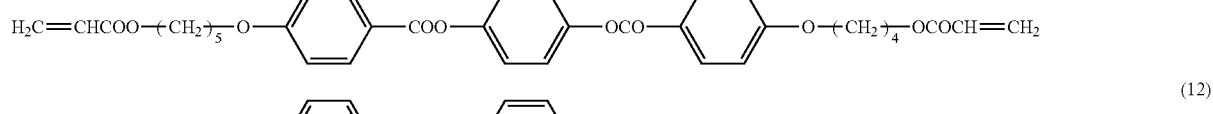
(11)

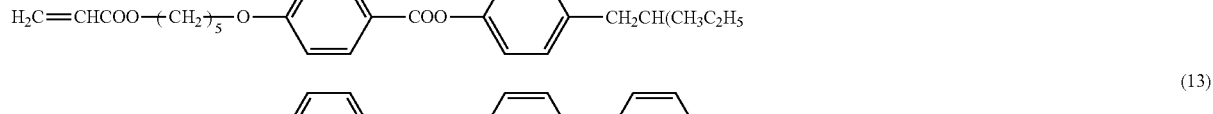
(12)

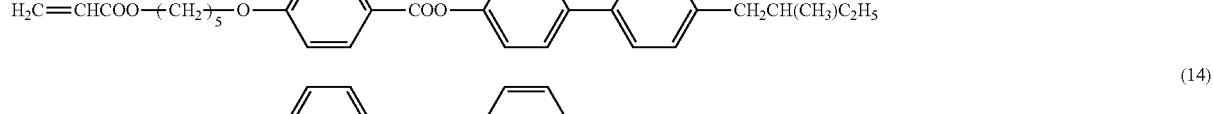
(13)

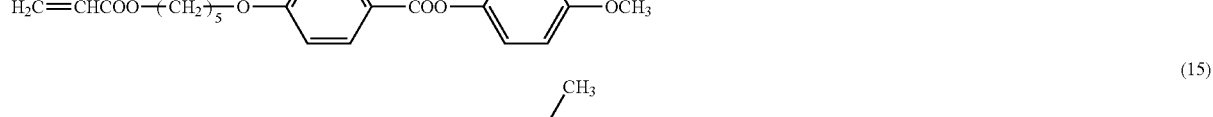
(14)

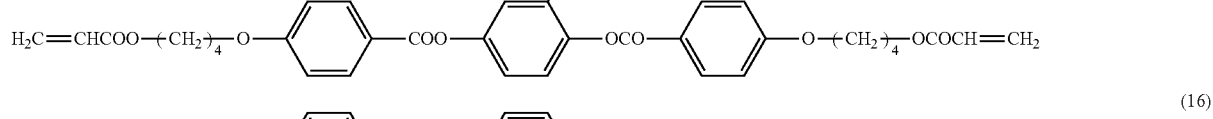
(15)

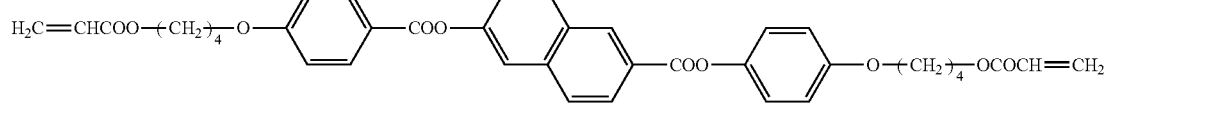
(16)

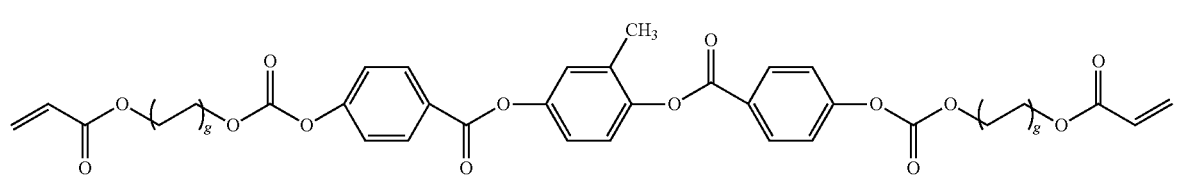
(17)

g: an integer from 2 to 5

In the present invention, as the rodlike compound, only one kind may be used, or two or more kinds may be used as a mixture.

For example, when a mixture of a liquid crystalline material having one or more polymerizable functional groups on the both ends and a liquid crystalline material having one or more polymerizable functional groups on one end is used, it is preferable because the polymerization density (cross-linking density) and the optical characteristics can be adjusted optionally by adjustment of the composition ratio thereof.

(2) Other Compounds

In the optical functional layer in the present invention, other compound(s) may be included besides the above-mentioned rodlike compound. Such other compound is not particularly limited, so long as it does not disturb the random homogeneous alignment of the rodlike compound. As such other compound, a polymerizable material ordinarily used in a hard coat agent can be given, for example.

As the above polymerizable material, mention may be made, for example, of a polyester (metha)acrylate obtained by reacting (metha)acrylic acid with a polyester prepolymer which is obtained by condensing a polyvalent alcohol with a monobasic acid or a polybasic acid; a polyurethane(metha) acrylate obtained by mutually reacting a compound having a polyol group and a compound having two isocyanate groups and then reacting the reaction product thereof with (metha) acrylic acid; photopolymerizable compounds, such as epoxy (metha)acrylates, obtained by reacting (metha)acrylic acid with an epoxy resin such as a bisphenol A type epoxy resin, a bisphenol F type epoxy resin, a novolac type epoxy resin, a polycarboxylic acid polyglycidyl ester, polyol polyglycidyl ether, an aliphatic or alicyclic epoxy, an amino group epoxy resin, a triphenol methane type epoxy resin or a dihydroxy benzene type epoxy resin; a photopolymerizable liquid crystalline compound having an acrylic group or a methacrylic group, etc.

(3) Optical Functional Layer

The thickness of the optical functional layer in the present invention is not particularly limited, so long as it is in a range in which desired optical characteristics can be imparted upon the optical functional layer, depending upon the kind of the above rodlike compound. Particularly, in the present invention, the thickness of the optical functional layer is preferably in a range of 0.5 µm to 10 µm, more preferably in a range of 0.5 µm to 5 µm, and particularly preferably in a range of 1 µm to 3 µm. If the thickness of the optical functional layer is greater than the above range, it may be that the "in-plane alignment properties" as one of the features of the random homogeneous alignment is damaged, so that the desired optical characteristics are not obtained. If the thickness is smaller than the above range, it may also be that the targeted optical characteristics are not obtained depending upon the kind of the above rodlike compound.

Here, in the optical functional film of the present invention, when the bonding portion between the optical functional layer and the substrate mentioned later possess the mixed region in which both of them are "mixed", the thickness of the mixed region is not included in the thickness of the above optical functional layer.

From the standpoint of the "irregularity" and the "in-plane alignment properties" possessed by the above random homogeneous alignment, as mentioned above, the retardation (Re) of the optical functional layer in the present invention is preferably in the range of 0 nm to 5 nm, more preferably in a range of 0 nm to 3 nm in that range, and particularly preferably in a range of 0 nm to 1 nm. Here, the definition and the measuring method of the Re value are as mentioned above, and thus explanation is omitted here.

Furthermore, as to the optical functional layer in the present invention, the value (Re/d) obtained by dividing the retardation (Re (nm)) of the optical functional layer by the thickness "d" (pm) of the optical functional layer is preferably in a range of 0 to 0.2, more preferably in a range of 0 to 0.1, and particularly preferably in a range of 0 to 0.05.

From the standpoint of the "in-plane alignment properties" possessed by the above random homogeneous alignment, as mentioned above, the retardation in the thickness direction (Rth) of the optical functional layer in the present invention is preferably in the range of 50 nm to 400 nm, more preferably in a range of 50 nm to 300 nm in that range, and particularly preferably in a range of 50 nm to 200 nm. Here, the definition and the measuring method of the Rth value are as mentioned above, and thus explanation is omitted here.

Meanwhile, as to the optical functional layer in the present invention, the value (Rth/d) which is obtained by dividing the retardation value in the thickness direction (Rth(nm)) of the optical functional layer by the thickness (d(µm)) of the optical functional layer is preferably in a range of 0.5 to 13, more preferably in a range of 0.5 to 10, and particularly preferably in a range of 0.5 to 7.

From the standpoint of the "dispersibility" possessed by the above random homogeneous alignment, as mentioned above, the haze of the optical functional layer in the present invention is preferably in a range of 0% to 5%, more preferably in a range of 0% to 1%, and particularly preferably in a range of 0% to 0.5%. Here, the definition and the measuring method of the haze are as mentioned above, and thus explanation is omitted here.

The configuration of the optical functional layer in the present invention is not limited to a single layer structure, but the optical functional layer may have a configuration in which a plurality of layers is laminated. In the case of the configuration in which the plural layers are laminated, the layers having the same composition may be laminated, or the plural layers having different compositions may be laminated. Further, in the case of the configuration in which the optical functional layer is composed of the plural layers, at least the optical functional layer laminated directly on the substrate has only to possess the rodlike compound forming the random homogeneous alignment.

2. Substrate

Next, the substrate used in the present invention will be explained. The substrate used in the present invention has the function as the optically negative C-plate. Further, as mentioned later, since the above optical functional layer is formed directly on the substrate in the optical functional film of the present invention, the rodlike compound contained in the optical functional layer forms the random homogeneous alignment. Therefore, the substrate used in the present invention has a function as a so-called alignment film for making the above rodlike compound form the random homogeneous alignment. In the following, the substrate used in the present invention will be explained.

The substrate used in the present invention is not particularly limited, so long as it has the property as the optically negative C-plate. Here, that "has the property as the optically negative C-plate" in the present invention means that the relationship: Nx=Ny>Nz is satisfied in which Nx and Ny are respectively the refractive indexes in arbitrary x-direction and y-direction in the plane of the substrate sheet, and Nz is the refractive index in the thickness direction.

The substrate having the property as the optically negative C-plate is used as the substrate in the present invention for the following reason. That is, as mentioned above, the substrate in the present invention functions as the so-called alignment film for making the rodlike compound form the random homogeneous alignment. If the substrate does not have the property as the optically negative C-plate, the rodlike compound cannot form the random homogeneous alignment.

In the present invention, the mechanism in which the rodlike compound forms the random homogeneous alignment when the optical functional layer containing the rodlike compound is formed on the substrate having the property as the optically negative C-plate is not clear. But, this is considered to be based on the following mechanism.

That is, for instance, if a case of the substrate being made of a polymer material is considered, it is thought that when the substrate has the property as the optically negative C-plate, the polymer material constituting the substrate is aligned random, without specific regularity, in the in-plane direction. It is thought that when the above rodlike compound is applied onto the substrate having the polymer material aligned randomly in the in-plane direction on the surface, the rodlike compound partially penetrates into the substrate, and the molecular axes are aligned along those molecular axes of the polymer material which are aligned randomly. It is thought that such a mechanism makes the substrate having the optically negative C-plate exhibit the function as the alignment film to form the random homogeneous alignment.

It is considered that the above substrate has the function as the alignment film for making the rodlike compound form the random homogeneous alignment through the above-mentioned mechanism. Therefore, the substrate used in the present invention must have an alignment controlling power for the rodlike compound, and must take a configuration in which that material constituting the substrate which exhibits the property as the optically negative C-plate must be present at the surface of the substrate. Accordingly, even if the substrate has the property as the optically negative C-plate, that configuration cannot be used as the substrate in the present invention, in which when the optical functional layer is formed on the substrate, the above rodlike compound cannot contact that material constituting the substrate which has the alignment controlling power for the rodlike compound.

As such a substrate being unable to be used in the present invention, for example, mention may be made of a substrate having a configuration that a supporting body having a construction made of a polymer material alone and having the property as the optically negative C-plate is laminated with a retardation layer containing an optically anisotropic material with a refractive index anisotropic property. In the substrate having such a configuration, the polymer material constituting the supporting body is that material constituting the substrate which has the alignment controlling power to the above rodlike compound. However, when the above optical functional layer is formed on the retardation layer, the rodlike compound cannot contact the polymer material due to the presence of the retardation layer. Therefore, the substrate having such a configuration is not included in the substrate, in the present invention, even having the property as the optically negative C-plate.

The property of the optically negative C-plate of the substrate used in the present invention may be appropriately selected depending upon the kind of the rodlike compound used in the above optical functional layer, the optical characteristics required for the optical functional film of the present invention, etc. Especially, in the present invention, the retardation in the thickness direction (Rth) of the substrate is preferably in a range of 20 nm to 100 nm, particularly preferably in a range of 25 nm to 80 nm, and most preferably in a range of 30 nm to 60 nm in that range. This is because, when the retardation in the thickness direction (Rth) of the substrate is in the above range, the random homogeneous alignment is easily formed in the optical functional layer, irrespective of the kind of the rodlike compound. Further, when the Rth of the substrate is in the above range, the random homogeneous alignment having a uniform quality can be formed.

Here, the definition and the measuring method of the Rth are identical with those explained in the above section "1. Optical functional layer", and thus explanation thereof is omitted here.

In addition, from the standpoint of the formation of the random homogeneous alignment having the uniform quality, the Rth is in the above range, and the in-plane retardation (Re) is preferably in a range of 0 nm to 300 nm, particularly preferably in a range of 0 nm to 150 nm, and more preferably in a range of 0 nm to 125 nm.

The transparency of the substrate used in the present invention may be determined optionally according to the transparency required to the optical functional film of the present invention, or the like. In general, it is preferable that the transmittance in a visible light zone is 80% or more, and it is more preferably 90% or more. This is because, if the transmittance is low, the selection ranges in the rodlike compound and the like becomes narrow. Here, the transmittance of the substrate can be measured according to the JIS K7361-1 (Testing method of the total light transmittance of a plastic-transparent material).

The thickness of the substrate used in the present invention is not particularly limited as long as necessary self supporting properties can be obtained according to the application of the optical functional film of the present invention, or the like. In general, it is preferably in the range of 10 µm to 188 µm; it is more preferably in the range of 20 µm to 125 µm; and it is particularly preferably in the range of 30 µm to 80 µm. In the case the thickness of the substrate is thinner than the above-mentioned range, the necessary self supporting properties may not be provided to the optical functional film of the present invention. Moreover, in the case the thickness is thicker than the above-mentioned range, for example, at the time of cutting process of the optical functional film of the present invention, the process waste may be increased or wear of the cutting blade may be promoted.

Here, in the optical functional film of the present invention, in the case the bonding portion of the optical functional layer and the substrate to be explained has a mixed region with themselves "mixed", the thickness of the optical functional layer includes the thickness of the above-mentioned mixed region.

As the substrate used in the present invention, either a flexible material having the flexible property or a rigid material without the flexible property can be used as long as it has the above-mentioned optical properties, however, it is preferable to use a flexible material. Since the flexible material is used, the production process for the optical functional film of the present invention can be provided as a roll-to-roll process so that an optical functional film having the excellent productivity can be obtained.

As the material for the above-mentioned flexible material, cellulose derivatives, a norbornen based polymer, a cycloolefin based polymer, polymethyl methacrylate, polyvinyl alcohol, polyimide, polyallylate, polyethylene terephthalate, polysulfone, polyether sulfone, amorphous polyolefin, a modified acrylic based polymer, polystyrene, an epoxy resin, polycarbonate, polyesters, or the like can be presented. Among them, cellulose derivatives can be used preferably since cellulose derivatives have especially excellent optical isotropy and can provide an optical functional film excellent in optical characteristics.

As the cellulose derivatives used in the present invention, cellulose esters can be used preferably. Furthermore, among the cellulose esters, it is preferable to use cellulose acylates. Since the cellulose acylates are used widely in the industrial field, it is advantageous in terms of the accessibility convenience.

As the cellulose acylates, lower fatty acid esters having 2 to 4 carbon atoms are preferable. The lower fatty acid ester may be one including a single lower fatty acid ester such as a cellulose acetate, or it may be one including a plurality of lower fatty acid esters such as a cellulose acetate butylate and a cellulose acetate propionate.

In the present invention, among the above-mentioned lower fatty acid esters, a cellulose acetate can be used particularly preferably. As the cellulose acetate, it is preferable to use triacetyl cellulose having the average acetification degree of 57.5 to 62.50 (substitution degree: 2.6 to 3.0). Since triacetyl cellulose has the molecular structure having relatively bulky side chains, when the substrate is made of the triacetyl cellulose, the rodlike compound forming the above optical functional layer is likely to penetrate into the substrate, and thus the adhesion property between the substrate and the optical functional layer can be improved. In addition, since triacetyl cellulose readily exhibits the property as the optically negative C-plate, the random homogeneous alignment of the rodlike compound is easily formed. Here, an acetification degree means an amount of bonded acetic acid per unit mass of cellulose. The acetification degree can be determined through measurement and calculation of the acetification degree in ASTM: D-817-91 (a testing method for cellulose acetate, etc). Note that the acetification degree of triacetyl cellulose constituting the triacetyl cellulose film can be determined by the above method after impurities such as a plasticizer, etc. contained in the film are removed.

As the norbornen based polymer, a cycloolefin polymer (COP) and a cycloolefin copolymer (COC) can be presented. In the present invention, it is preferable to use a cycloolefin polymer. Since the cycloolefin polymer has low absorbing properties and transmitting properties of the moisture content, by using the substrate made of the cycloolefin polymer in the present invention, the optical functional film of the present invention can be provided with the excellent temporal stability of the optical characteristics.

The configuration of the substrate in the present invention is not limited to a single layer configuration, but it may have a configuration in which a plurality of layers is laminated. When the substrate has the configuration in which a plurality of the layers is laminated, the layers having the same composition may be laminated, or the plural layers having different compositions may be laminated.

As the configuration of the substrate in which the plural layers having the different compositions are laminated, for instance, a configuration is given by example, in which a supporting body having excellent moisture permeability and self-supporting property is laminated upon a film made of a material, such as triacetyl cellulose, to make the above rodlike compound to be aligned random and homogeneously.

3. Optical Functional Film

Since one of the features of the optical functional film of the present invention is that the optical functional layer is formed directly on the substrate, the rodlike compound contained in the optical functional layer penetrates into the above substrate, and the mixed region in which both are "mixed" is formed at the bonding portion between the substrate and the optical functional layer. The thickness of such a mixed region is not particularly limited, so long as the above random homogeneous alignment can be formed, and the adhesion force between the substrate and the optical functional layer can be set in a desired range. Especially, in the present invention, the thickness of the mixed region is preferably in a range of 0.1 µm to 10 µm, particularly preferably in a range of 0.5 µm to 5 µm, and most preferably in a range of 1 µm to 3 µm in that range.

The distributed state of the rodlike compound in the mixed region is not particularly limited, either, so long as the random homogeneous alignment can be formed, and adhesion force between the substrate and the optical functional layer can be set in a desired range. As the above distributed state of the rodlike compound, a configuration in which the rodlike compound exists uniformly in the thickness direction of the substrate and a configuration in which the rodlike compound has a concentration gradient in the thickness direction of the substrate are given by way of example. Either of the configurations can be favorably used in the present invention.

Meanwhile, the confirmation of the presence of the mixed region and the confirmation of the distributed state of the rodlike compound in the mixed region can be made by a TOE-SIMS method.

The optical functional film of the present invention may have other configurations other than the substrate and the optical functional layer. As the other configurations, for example, a reflection preventing layer, an ultraviolet ray absorbing layer, an infrared ray absorbing layer, or a charge preventing layer can be presented.

The reflection preventing layer used in the present invention is not particularly limited. For example, one comprising a low refractive index layer formed on a transparent substrate film, in which the layer made of a substance having a refractive index lower than that of the transparent substrate is formed; or one comprising a high refractive index layer made of a substance having a refractive index higher than that of the transparent substrate and a low refractive index layer made of a substance having a refractive index lower than that of the transparent substrate formed in this order alternately by each one or more layers on a transparent substrate film can be presented. These high refractive index layer and the low refractive index layer are formed such as by vacuum vapor deposition or coating so as to have the optical thickness represented by the multiple of the geometric thickness and the refractive index by ¼ of the wavelength of the light beam to have the reflection prevention. As the constituent material for the high refractive index layer, titanium oxide, zinc sulfide, or the like; as the constituent material for the low refractive index layer, magnesium fluoride, cryolite, or the like can be used.

Moreover, the ultraviolet ray absorbing layer used in the present invention is not particularly limited. For example, a film formed by adding an ultraviolet ray absorbing agent made of such as a benzotriazol based compound, a benzophenone based compound, or a salicylate based compound in a film of such as a polyester resin or an acrylic resin can be presented.

Moreover, the infrared ray absorbing layer used in the present invention is not particularly limited. For example, one formed by such as coating an infrared ray absorbing layer on a film substrate of a polyester resin can be presented. As the infrared ray absorbing layer, for example, one formed by adding an infrared ray absorbing agent made of such as a diimmonium based compound or a phthalocyanine based compound in a binder resin made of such as an acrylic resin or a polyester resin can be used.

Moreover, as the charge preventing layer used in the present invention, for example, various kinds of cation charge preventing agents having a cation group such as quaternary ammonium salt, pyridinium salt, and primary to tertiary amino salts; anion charge preventing agents having an anion group such as a sulfonic acid base, an ester sulfide base, an ester phosphate base, and a phosphoric acid base; amphoteric charge preventing agents of such as the amino acid based, and the amino ester sulfide based; nonion charge preventing agents of such as the amino alcohol based, the glycerol based, and the polyethylene glycol based; polymer type charge preventing agents with the above-mentioned charge preventing agents provided with a high molecular weight; those formed as a film by adding a charge preventing agent such as a monomer or an oligonomer having a tertiary amino group or a quaternary ammonium group and to be polymerized by the ionizing radiation, such as N,N-dialkyl amino alkyl(meth) acrylate monomer and a quaternary compound thereto can be presented.

The thickness of the optical functional film of the present invention is not particularly limited, so long as it can exhibit the desired optical characteristics. Ordinarily, the thickness is preferably in a range of 10 μm to 200 μm, and particularly preferably in a range of 20 μm to 100 μm.

Meanwhile, the haze value of the optical functional film of the present invention as measured according to the JIS K7105 is preferably in a range of 0% to 5%, particularly preferably in a range of 0% to 1%, and most preferably in a range of 0% to 0.5%.

The application of the optical functional film of the present invention is not particularly limited, and it can be used as the optical functional film for various applications. As the concrete application of the optical functional film of the present invention, for example, an optical compensator (for example, a viewing angle compensator), an elliptical polarizing plate, a luminance improving plate, etc. used in the liquid crystal displays can be cited. Particular, in the present invention, the optical functional film can be used in the application as the negative C-plate. When the optical functional film is used as the optical compensator as the negative C-plate in this manner, it can be favorably used in a liquid crystal display having a liquid crystal layer with a VA mode, an OCB mode or the like.

In addition, when the optical functional film of the present invention is bonded to a polarizing layer, they can be used as a polarizing film. The polarizing film ordinarily comprises a polarizing layer and protective layers formed on opposite surfaces thereof. In the present invention, for example, when one of the protective layers is made of the above-mentioned optical functional film, a polarizing film having an optical compensation function to improve the viewing angle characteristics of the liquid crystal display can be obtained, for example.

Although not limited, as the above polarizing layer, an iodine based polarizing layer, a dye based polarizing layer using a dichromatic dye, a polyene based polarizing layer, etc. can be used, for example. The iodine based polarizing layer and the dye based polarizing layer are generally produced by using polyvinyl alcohol.

The optical functional film of the present invention may be used after being subjected to a drawing treatment. Although an embodiment of such a drawing treatment is not particularly limited, for example, an embodiment in which the optical functional film of the present invention is drawn and used as a biaxial film can be given.

4. Producing Method of an Optical Functional Film

Next, a producing method of an optical functional film according to the present invention will be explained. The producing method of an optical functional film according to the present invention is not particularly limited, so long as it can form the optical functional layer having the random homogeneous alignment on the above substrate. A method for coating a composition for forming an optical functional layer prepared by dissolving the above rod-like compound on the substrate is ordinarily used. Since the rodlike compound can be penetrated into the substrate together with the solvent in such a method, the interaction between the rodlike compound and the material constituting the substrate can be strengthen, so that the rodlike compound is likely to form the random homogeneous alignment. In the following, the producing method of an optical functional film will be explained.

The above composition for forming an optical functional layer ordinarily comprises the rodlike compound and the solvent, and may contain other compound, if necessary. Note that the rodlike compound used in the composition for forming an optical functional layer and the substrate are identical with those explained in the above "1. Optical functional layer" and "2. Substrate", and thus explanation is omitted here.

The solvent used in the composition for forming an optical functional layer is not particularly limited, so long as it can solve the rodlike compound at a given concentration. As the solvent used in the present invention, for example, hydrocarbon based solvents such as benzene and hexane: ketone based solvents such as methyl ethyl ketone, methyl isobutyl ketone and cyclohexanone; ether based solvents such as tetrahydrofuran and 1,2-dimethoxy ethane; halogenated alkyl based solvents such as chloroform and dichloromethane; ester based solvents such as methyl acetate, butyl acetate and propylene glycol monomethyl ether acetate; amide based solvents such as N,N-dimethyl formamide;or sulfoxide based solvents such as dimethyl sulfoxide can be presented, however, it is not limited thereto. The solvent may be a single kind or a mixture of at least two kinds.

Among the above solvents, in the present invention, a ketone based solvent is preferably used, and cyclohexane is particularly favorably used.

The content of the rodlike compound in the composition for forming an optical functional layer is not particularly limited, so long as it is in such a range as to set the viscosity of the composition for forming an optical functional layer at a desired value depending upon a coating system for forming the optical functional layer on the substrate by coating, etc. Most of all, in the present invention, the content of the rodlike compound in the composition for forming an optical functional layer is preferably in a range of 0.1 mass % to 60 mass %, particularly in a range of 1 mass % to 50 mass %, most preferably in a range of 10 mass % to 40 mass %.

A photopolymerization initiator may be included in the composition for forming an optical functional layer, if needed. Particularly when the optical functional layer is cured by irradiation with ultraviolet rays, the photopolymerization initiator is preferably included. As the photopolymerization initiating agent, for example, benzophenone, o-benzoyl methyl benzoate, 4,4-bis(dimethyl amine)benzophenone, 4,4-bis(diethyl amine)benzophenone, α-amino-acetophenone, 4,4-dichlorobenzophenone, 4-benzoyl-4-methyl diphenyl ketone, dibenzyl ketone, fluorenone, 2,2-diethoxy acetophenone, 2,2-dimethoxy-2-phenyl acetophenone, 2-hydroxy-2-methyl propiophenone, p-tert-butyl dichloroacetophenone, thioxantone, 2-methyl thioxantone, 2-chlorothioxantone, 2-isopropyl thioxantone, diethyl thioxantone, benzyl dimethyl ketal, benzyl methoxy ethyl acetal, benzoin methyl ether, benzoin butyl ether, anthraquinone, 2-tert-butyl anthraquinone, 2-amyl anthraquinone, β-chloranthraquinone, anthrone, benzanthrone, dibenzsuberone, methylene anthrone, 4-azidobenzyl acetophenone, 2,6-bis(p-azidobenzylidene)cyclohexane, 2,6-bis(p-azidobenzylidene)-4-methyl cyclohexanone, 2-phenyl-1,2-butadion-2-(o-methoxy carbonyl)oxime, 1-phenyl-propane dion-2-(o-ethoxy carbonyl)oxime, 1,3-diphenyl-propane trion-2-(o-ethoxy carbonyl)oxime, 1-phenyl 3-ethoxy-propane trion-2-(o-benzoyl)oxime, Michler's ketone, 2-methyl-1[4-(methyl thio)phenyl]-2-morpholino propane-1-on, 2-benzyl-2-dimethyl amino-1-(4-morpholino phenyl)-butanone, naphthalene sulfonyl chloride, quinoline sulfonyl chloride, n-phenyl thioacrydone, 4,4-azo bis isobuthyronitrile, diphenyl disulfide, benzthiazol disulfide, triphenyl phosphine, camphor quinone, N1717 produced by Asahi Denka Co., Ltd., carbon tetrabromate, tribromo phenyl sulfone, benzoin peroxide, eosin, or a combination of a photo reducing pigment such as a methylene blue and a reducing agent such as ascorbic acid and triethanol amine can be presented as an example. In the present invention, these photo polymerization initiating agents can be used only by one kind or as a combination of two or more kinds.

Furthermore, in the case of using the photo polymerization initiating agent, a photo polymerization initiating auxiliary agent can be used in combination. As such a photo polymerization initiating auxiliary agent, tertiary amines such as triethanol amine, and methyl diethanol amine; benzoic acid derivatives such as 2-dimethyl aminoethyl benzoic acid and 4-dimethyl amide ethyl benzoate, or the like can be presented, however, it is not limited thereto.

In the composition for forming an optical functional layer of the present invention, the following compounds may be added in the range not to deteriorate the purpose of the present invention.

As the compound to be added, for example, polyester (meth)acrylate obtained by reacting (meth)acrylic acid with a polyester prepolymer obtained by condensation of a polyhydric alcohol and a monobasic acid or a polybasic acid; polyurethane(meth)acrylate obtained by reacting a polyol group and a compound having two isocyanate groups, and reacting the reaction product with (meth)acrylic acid; a photo polymerizable compound such as epoxy(meth)acrylate obtained by reacting (meth)acrylic acid with epoxy resins such as a bisphenol A type epoxy resin, a bisphenol F type epoxy resin, a novolak type epoxy resin, polycarboxylic acid glycidyl ester, polyol glycidyl ether, an aliphatic or alicyclic epoxy resin, an amino group epoxy resin, a triphenol methane type epoxy resin, and a dihydroxy benzene type epoxy resin; or a photo polymerizable liquid crystalline compound having an acrylic group or a methacrylic group can be presented. The addition amount of these compounds with respect to the composition for forming an optical functional layer can be determined in the range not to deteriorate the purpose of the present invention. Since the compounds mentioned above are added, the mechanical strength of the optical functional layer can be improved so that the stability may be improved.

Other compound than the above may be included in the composition for forming an optical functional layer, if needed. Other compound, which depends upon the application of the optical functional film of the present invention, etc., is not particularly limited, so long as it does not damage the optical characteristics of the optical functional layer of the present invention.

As the coating method for coating the composition for forming an optical functional layer onto the alignment layer is not particularly limited as long as it is a method capable of achieving a desired flatness. As the method, for example, the gravure coating method, the reverse coating method, the knife coating method, the dip coating method, the spray coating method, the air knife coating method, the spin coating method, the roll coating method, the printing method, the dipping and pulling up method, the curtain coating method, the die coating method, the casting method, the bar coating method, the extrusion coating method, or the E type applying method can be presented, but they are not limited thereto.

The thickness of the coated film of the composition for forming an optical functional layer is not particularly limited as long as it is in the range capable of achieving a desired flatness. In general, it is in the range of 0.1 μm to 50 μm; it is more preferably in the range of 0.5 μm to 30 μm; and it is particularly preferably in the range of 0.5 μm to 10 μm. In the case the thickness of the coated film of the composition for forming an optical functional layer is thinner than the above-mentioned range, the flatness of the optical functional layer to be formed may be deteriorated. Moreover, in the case the thickness is thicker than the above-mentioned range, due to the increase of the dry load of the solvent, the productivity may be lowered.

As the method for drying the coated film of the composition for forming an optical functional layer, a commonly used drying method such as the heat drying method, the pressure reducing drying method, and the gap drying method can be used. Moreover, the drying method in the present invention is not limited to a single method. For example, a plurality of drying methods may be adopted by an embodiment such as of changing the drying methods successively according to the residual solvent amount.

In the case of using a polymerizable material as the rodlike compound, the method for polymerizing the polymerizable material can be determined optionally according to the kind of the polymerizable functional group of the polymerizable material. In particular, in the present invention, a method of curing the material by the active radiation is preferable. The active radiation is not particularly limited as long as it is a radiation capable of polymerizing the polymerizable material. In general, it is preferable to use an ultraviolet ray or a visible light beam in terms of the device convenience, or the like. In particular, it is preferable to use an irradiation beam having a 150 nm to 500 nm wavelength, more preferably 250 nm to 450 nm, and further preferably 300 nm to 400 nm.

As the light source for the irradiation beam, for example a low pressure mercury lamp (a sterilizing lamp, a fluorescent chemical lamp, a black light), a high pressure discharge lamp (a high pressure mercury lamp, a metal halide lamp), or a short arc discharge lamp (a ultra high pressure mercury lamp, a xenon lamp, a mercury xenon lamp) can be presented. In particular, use of such as the metal halide lamp, the xenon lamp, or the high pressure mercury lamp can be recommended. Moreover, the irradiation can be carried out while optionally adjusting the irradiation intensity according to such as the content of the photo polymerization initiating agent.

B. Retardation Film

Next, the retardation film of the present invention will be explained. The retardation films of the present invention can be broadly classified into two embodiments according to forms thereof. Therefore, the retardation film of the present invention will be explained below with respect to each of the forms successively.

B-1: Retardation Film According to the First Embodiment

To begin with, the retardation film of the first embodiment of the present invention will be explained. The retardation film of this embodiment is characterized by using the optical functional film described in the above section "A. Optical functional film" and by the retardation in the thickness direction (Rth) of the optical functional film being in a range of 50 nm to 400 nm.

Since the retardation in the thickness direction (Rth) is in the above range according to this embodiment, the retardation film suitable for improving the viewing angle characteristics of the liquid crystal display of the VA (Vertical Alignment) system can be obtained from the optical functional film of the present invention in combination with an A plate.

In this embodiment, the Rth is more preferably in a range of 100 nm to 300 nm.

The in-plane retardation (Re) of the retardation film of this embodiment is preferably in a range of 0 nm to 5 nm. This is because, when the in-plane retardation (Re) is in the above range, the retardation film of this embodiment can be used as the retardation film suitable for improving the viewing angle characteristics of the liquid crystal display of the VA (Vertical Alignment) system.

The in-plane retardation (Re) value may depend upon the wavelength. For example, an embodiment suffices, in which the Re value is greater on the longer wavelength side than on the shorter wavelength side, or an embodiment also suffices, in which the Re value is greater on the shorter wavelength side than on the longer wavelength side. Since the Re value has such wavelength dependency, when the retardation film of this embodiment is used for improving the viewing angle characteristics of the liquid crystal display, for example, the viewing angle characteristics of the liquid crystal display element can be improved over the entire visible light zone.

Further, in this embodiment, the Re is preferable in a range of 0 nm to 3 nm, more preferably in a range of 0 nm to 1 nm.

Note that the optical functional film used in this embodiment is the same as described in the above section "A. Optical functional film", and thus explanation is omitted here.

Further, the producing method of the retardation film of this embodiment is not particularly limited, so long as the above optical characteristics can be exhibited. For example, the retardation film can be produced by the method described in the producing method of an optical functional film of the above "A. Optical functional film".

B-2. Retardation Film of the Second Embodiment

Next, the retardation film of the second embodiment of the present invention will be explained. The retardation film of this embodiment comprises a substrate having the property as the A plate or the B plate and the property as the negative C-plate, and a retardation layer containing the rodlike compound, wherein the retardation layer is formed directly on the substrate, and the rodlike compound forms the random homogeneous alignment in the retardation layer.

Next, the retardation film of this embodiment will be explained with reference to the drawings. FIG. 3 is a schematically perspective view showing an example of the retardation film of this embodiment. As shown in FIG. 3, the retardation film 20 of this embodiment comprises a substrate 21 and a retardation layer 22 formed directly on the substrate 21. In the retardation film 20 of this embodiment, the substrate 21 has the property as the A plate or the B plate and the property as the negative C-plate. Further, the retardation layer 22 contains the rodlike compound 23 forming the random homogeneous alignment. As shown in FIG. 3, the retardation film 20 of this embodiment has the configuration that the retardation layer 22 is formed directly on the substrate 21, and the retardation film does not have an alignment layer as an indispensable constituent element in the conventional retardation film.

Since the retardation layer is formed directly on the substrate in the retardation film of this embodiment as shown in FIG. 3, the substrate and the retardation layer can be firmly adhered. Therefore, the retardation film has a merit of excellent adhesion stability. Further, with such improvement in the adhesion property, the retardation film has also merits, for example, that the alkaline resistance and reworkability are improved.

Here, the "formed directly" means that the substrate and the retardation layer are formed to be brought into direct contact with each other without intervention of other layer such as an alignment layer between the substrate and the retardation layer, for example.

It is considered that the adhesion force between the substrate and the retardation layer is improved by forming the latter directly on the former by the following mechanism. That is, since the formation of the retardation layer directly on the substrate allows the rod-like molecules contained in the retardation layer to penetrate into the substrate from the surface thereof, there is no clear interface at a bonding portion between the substrate and the retardation layer, and the bonding portion is in a "mixed" state of them. Thus, it is considered that the adhesion property is conspicuously improved owing to this as compared with the bonding through the conventional interface interaction.

In addition, the conventional retardation film with the alignment layer had the problem that light underwent multiple reflections in the interface between the alignment layer and the retardation layer and in the interface between the alignment layer and the substrate to cause interference fringes. However, according to the optical functional film of this embodiment, there is no clear interface, because the film has no alignment layer and the bonding portion between the substrate and the retardation layer is in the "mixed" state. Therefore, the retardation film of this embodiment has the merits that the multiple reflections do not occur and the deterioration in quality does not occur owing to the interference fringes.

The substrate used in this embodiment has the feature that it has the property as the A plate or the B plate. The property as the A plate in this embodiment concretely means that the in-plane retardation (Re) of the substrate is not less than 30 nm. Here, the in-plane retardation (Re) is a value expressed by a formula: Re=(Nx−Ny)×d in which Nx and Ny are respectively the refractive index in the leading phase axis direction (the direction with the smallest refractive index) and the refractive index in the lagging phase axis direction (the direction with the largest refractive index) in the plane of the substrate used in this embodiment, and "d" is the thickness (nm) of the retardation layer. As the in-plane retardation (Re) value in this embodiment, a value measured by an automatic birefringence measuring instrument (manufactured by Oji Scientific Instruments, Trade name: KOBRA-21ADH) is used.

The property as the B plate in this embodiment means that the relationship: Nx>Ny>Nz is satisfied among the Nx, Ny and Nz.

Further, the substrate used in this embodiment also has the feature that it has the property as the negative C-plate. "The property as the negative C-plate" in this embodiment concretely means that the retardation in the thickness direction (Rth) of the substrate is not less than 10 nm. Here, the retardation in the thickness direction (Rth) is a value expressed by a formula: Rth{(Nx+Ny)/2−Nz}×d in which Nx and Ny are respectively the refractive index in the leading phase axis direction (the direction with the smallest refractive index) and the refractive index in the lagging phase axis direction (the direction with the largest refractive index) in the plane of the substrate used in this embodiment, Nz is the refractive index in the thickness direction, and "d" is the thickness (nm) of the retardation layer. As the retardation value in the thickness direction (Rth) in this embodiment, a value measured by the automatic birefringence measuring instrument (manufactured by Oji Scientific Instruments, Trade name: KOBRA-21ADH) is used.

Here, the random homogeneous alignment in this embodiment is identical with that explained in the above section "A. Optical functional film", and thus explanation is omitted here.

The retardation film of the present invention comprises the substrate having the property as the A plate or the B plate and the property as the negative C-plate, and the retardation layer containing the rodlike compound forming the random homogeneous alignment. Since the rodlike compound forming the random homogeneous alignment makes the retardation layer excellently exhibit the optical characteristics to function as the negative C-plate, the retardation film of the present invention as a whole has the property as the A plate or the B plate and the property as the negative C-plate. Since the retardation film of the present invention has such optical characteristics, only one retardation film of the present invention can accomplish the object as compared with the conventional method for improving the viewing angle dependency of the liquid crystal display by using two retardation films: the A plate or the B plate and the negative C-plate.

FIGS. 4A and 4B are schematically sectional views showing examples of the conventional liquid crystal displays using an A plate and a negative C-plate, and FIG. 4C is a schematically sectional view showing an example of a liquid crystal display using the retardation film of the present invention. As shown in FIGS. 4A to 4C, since one retardation film 20 of the present invention (FIG. 4C) can perform the functions of the A plate 61 and the negative C-plate 62 used in FIGS. 4A and 4B, for example, the liquid crystal display can be advantageously thinned.

The retardation film of this embodiment comprises the substrate and the retardation layer formed directly on the substrate. In the following, each of such components will be explained in detail.

1. Retardation Layer

First, the retardation layer constituting the retardation film of this embodiment will be explained. The retardation layer in this embodiment is formed directly on the substrate mentioned later. The retardation layer in this embodiment can be firmly adhered to the substrate by forming it directly on the substrate. Further, the retardation layer in this embodiment contains the rodlike compound, which forms the random homogeneous alignment. The formation of the random homogeneous alignment with the rodlike compound in this manner can make the retardation film of this embodiment excellently exhibit the optical characteristics to function as the negative C-plate. In the following, such a retardation layer will be explained in detail.

(1) Rodlike Compound

The rodlike compound used in this embodiment will be explained. The rodlike compound used in this embodiment is not particularly limited, so long as it can form the random homogeneous alignment in the retardation layer.

Here, the rodlike compound used in this embodiment is identical with that explained in the above section "A. Optical functional film", and thus explanation is omitted here.

(2) Other Compounds

The retardation layer in this embodiment may contain other compound(s) than the rodlike compound. Such other compound is not particularly limited, so long as it does not disturb the random homogeneous alignment of the rodlike compound. As such other compound, a photopolymerization initiator, a polymerization inhibitor, a leveling agent, a chiral agent, a silane coupling agent, etc. are given.

(3) Retardation Layer

The thickness of the optical functional layer in the present embodiment is not particularly limited, so long as it is in a range in which desired optical characteristics can be imparted upon the retardation layer, depending upon the kind of the rodlike compound. Particularly, in the present embodiment, the thickness of the retardation layer is preferably in a range of 0.5 µm to 10 µm, more preferably in a range of 0.5 µm to 8 µm, and particularly preferably in a range of 0.5 µm to 6 µm. For, if the thickness of the retardation layer is greater than the above range, it may be that the "in-plane alignment properties" as one of the features of the random homogeneous alignment is damaged, so that the desired optical characteristics are not obtained. If the thickness is smaller than the above range, it may also be that the targeted optical characteristics are not obtained depending upon the kind of the rodlike compound.

Here, in the retardation film of the present embodiment, when the bonding portion between the retardation layer and the substrate mentioned later possess the mixed region in which both of them are "mixed", the thickness of the mixed region is not included in the thickness of the retardation layer.

From the standpoint of the "irregularity" and the "in-plane alignment properties" possessed by the random homogeneous alignment, as mentioned above, the retardation (Re) of the retardation layer in the present embodiment is preferably in the range of 0 nm to 5 nm, more preferably in a range of 0 nm to 3 nm, and particularly preferably in a range of 0 nm to 1 nm. Here, the definition and the measuring method of the Revalue are as mentioned above, and thus explanation is omitted here.

From the standpoint of the "in-plane alignment properties" possessed by the above random homogeneous alignment, as mentioned above, the retardation in the thickness direction (Rth) of the retardation layer in the present embodiment is preferably in the range of 50 nm to 400 nm, more preferably in a range of 100 nm to 300 nm, and particularly preferably in a range of 100 nm to 200 nm. Here, the definition and the measuring method of the Rth value are as mentioned above, and thus explanation is omitted here.

From the standpoint of the "dispersibility" possessed by the above random homogeneous alignment, as mentioned above, the haze of the retardation layer in the present embodiment is preferably 1% or less. Here, the definition and the measuring method of the haze are as mentioned above, and thus explanation is omitted here.

The configuration of the retardation layer in the present embodiment is not limited to a single layer structure, but the retardation layer may have a configuration in which a plurality of layers is laminated. In the case of the configuration in which the plural layers are laminated, the layers having the same composition may be laminated, or the plural layers having different compositions may be laminated. Further, in the case of the configuration in which the retardation layer is composed of the plural layers, at least the retardation layer laminated directly on the substrate has to possess the rodlike compound forming the random homogeneous alignment.

2. Substrate

Next, the substrate used in the present embodiment will be explained. The substrate used in the present embodiment has the function as an A plate or B plate, and the function as the negative C-plate. Further, as mentioned later, since the above retardation layer is formed directly on the substrate in the retardation film of the present embodiment, the rodlike compound contained in the retardation layer forms the random homogeneous alignment. Therefore, the substrate used in the present embodiment has a function as a so-called alignment film for making the rodlike compound form the random homogeneous alignment. In the following, the substrate used in the present embodiment will be explained.

The reason why the substrate having the property as the A plate or the B plate is used as the substrate in this embodiment is for affording the retardation film in this embodiment with the function as the A plate or the B plate. On the other hand, the reason why the substrate having the property as the negative C-plate is used as that used in this embodiment is for affording the retardation film in this embodiment with the function as the negative C-plate and to make the rodlike compound take the random homogeneous alignment in the retardation layer.

As mentioned above, the substrate in this embodiment functions as the so-called alignment film to make the rodlike compound form the random homogeneous alignment. If the substrate does not have the property as the negative C-plate, the rodlike compound cannot form the random homogeneous alignment. Therefore, the substrate has the property as the negative C-plate because of the latter reason.

In the present embodiment, the mechanism in which the rodlike compound forms the random homogeneous alignment when the retardation layer containing the rodlike compound is formed on the substrate having the property as the negative C-plate is not clear. But, this is considered to be based on the following mechanism.

That is, for instance, if a case of the substrate being made of a polymer material is considered, it is thought that when the substrate has the property as the negative C-plate, the polymer material constituting the substrate is aligned random, without specific regularity, in the in-plane direction. It is thought that when the above rodlike compound is applied onto the substrate having the polymer material aligned randomly in the in-plane direction on the surface, the rodlike compound partially penetrates into the substrate, and the molecular axes are aligned along those molecular axes of the polymer material which are aligned randomly. It is thought that such a mechanism makes the substrate having the negative C-plate exhibit the function as the alignment film to form the random homogeneous alignment.

It is considered that the above substrate has the function as the alignment film for making the rodlike compound form the random homogeneous alignment through the above-mentioned mechanism. Therefore, the substrate used in the present embodiment must have an alignment controlling power for the rodlike compound, and take a configuration in which that material constituting the substrate which exhibits the property as the negative C-plate must be present at the surface of the substrate. Accordingly, even if the substrate has the property as the negative C-plate, that configuration cannot be used as the substrate in the present embodiment, in which when the retardation layer is formed on the substrate, the rodlike compound cannot contact that material constituting the substrate which has the alignment controlling power for the above rodlike compound.

As such a substrate being unable to be used in this embodiment, for example, mention may be made of a substrate having a configuration that a supporting body having a construction made of a polymer material alone and having the property as the negative C-plate is laminated with a retardation layer containing an optically anisotropic material with a refractive index anisotropic property. In the substrate having such a configuration, the polymer material constituting the supporting body is that material constituting the substrate which has the alignment controlling power to the rodlike compound. However, when the retardation layer is formed on the substrate, the rodlike compound cannot contact the polymer material due to the presence of the retardation layer. Therefore, the substrate having such a configuration is not included in the substrate, in this embodiment, even having the property as the negative C-plate.

The substrate used in this embodiment is not particularly limited, so long as it has the property as the A plate or the B plate and the property as the negative C-plate. The property as the A plate of the substrate is not particularly limited, so long as the in-plane retardation (Re) is not less than 30 nm as mentioned above. In this embodiment, the Re is preferably in a range of 30 nm to 250 nm, more preferably in a range of 30 nm to 200 nm, and particularly preferably in a range of 30 nm to 150 nm. This is because, when the Re of the substrate used in this embodiment is in the above range, the retardation film of this embodiment can be provided with the excellent property as the A plate. Note that the definition and the measuring method of the above in-plane retardation are identical with those described above, and thus explanation is omitted here.

The property as the B plate of the substrate used in this embodiment is not particularly limited, so long as the Nx, Ny and Nz satisfy the relationship: Nx>Ny>Nz. The retardation in the thickness direction (Rth) of the substrate is preferably in a range of 30 nm to 200 nm, more preferably in a range of 30 nm to 170 nm, and particularly preferably in a range of 30 nm to 140 nm. Further, the in-plane retardation (Re) of the substrate is preferably in a range of 10 nm to 200 nm, more preferably in a range of 10 nm to 150 nm, and particularly preferably in a range of 10 nm to 100 nm.

Here, the definitions and the measuring methods of the retardation in the thickness direction (Rth) and the in-plane retardation (Re) are identical with those described above, and thus explanation is omitted here.

The property as the negative C-plate of the substrate used in this embodiment is not particularly limited, the retardation in the thickness direction (Rth) is not less than 10 nm as mentioned above. In this embodiment, the retardation in the thickness direction (Rth) is preferably in a range of 10 nm to 250 nm, more preferably in a range of 25 nm to 200 nm, and particularly preferably in a range of 40 nm to 150 nm. This is because, when the Rth of the substrate used in this embodiment is in the above range, the rodlike compound contained in the retardation layer can form the random homogeneous alignment having a more uniform quality. Note that the definition and the measuring method of the retardation in the thickness direction (Rth) are identical with those described above, and thus explanation is omitted here.

The transparency of the substrate used in the present embodiment may be determined optionally according to the transparency required to the retardation film of the present embodiment, or the like. In general, it is preferable that the transmittance in a visible light range is 80% or more, and it is more preferably 90% or more. This is because, if the transmittance is low, the selection ranges in the rodlike compound and the like becomes narrow. Here, the transmittance of the substrate can be measured according to the JIS K7361-1 (Testing method of the total light transmittance of a plastic-transparent material).

The thickness of the substrate used in the present embodiment is not particularly limited as long as necessary self supporting properties can be obtained according to the application of the retardation film of the present embodiment, or the like. In the present embodiment, it is preferably in the range of 10 μm to 188 μm; it is more preferably in the range of 20 μm to 125 μm; and it is particularly preferably in the range of 30 μm to 100 μm. In the case the thickness of the substrate is thinner than the above-mentioned range, the necessary self supporting properties may not be provided to the retardation film of the present embodiment. Moreover, in the case the thickness is thicker than the above-mentioned range, for example, at the time of cutting process of the retardation film of the present embodiment, the process waste may be increased or wear of the cutting blade may be promoted.

Here, in the retardation film of the present embodiment, in the case the bonding portion of the retardation layer and the substrate to be explained has a mixed region with themselves "mixed", the thickness of the retardation layer includes the thickness of the above-mentioned mixed region.

As the substrate used in the present embodiment, either a flexible material having the flexible property or a rigid material without the flexible property can be used as long as it has desired optical properties, however, it is preferable to use a flexible material. Since the flexible material is used, the production process for the retardation film of the present embodiment can be provided as a roll-to-roll process so that an optical functional film having the excellent productivity can be obtained.

Since materials constituting the flexible material are identical with those described in the section "A. Optical functional film", explanation is omitted here.

The substrate used in this embodiment is preferably subjected to a drawing treatment. This is because, when the substrate is subjected to the drawing treatment, the rodlike compound can easily penetrate into the substrate to attain excellent adhesion property between the substrate and the retardation layer, and the rodlike compound can form the random homogeneous alignment having a more uniform quality.

The above drawing treatment is not particularly limited, and may be determined arbitrarily depending upon the material constituting the substrate, etc. As such a drawing treatment, a uniaxial drawing treatment and a biaxial drawing treatment can be given by example.

The drawing condition in the drawing treatment is not particularly limited, so long as the substrate can be provided with a desired property as the A plate or the B plate and the property as the negative C-plate.

The configuration of the substrate in this embodiment is not limited to a single layer configuration, but it may have a configuration in which plural layers are laminated. When the substrate has the configuration in which the plural layers are laminated, the layers having the same composition may be laminated, or the plural layers having different compositions may be laminated.

As the configuration of the substrate in which the plural layers having the different compositions are laminated, an example in which a film made of a material such as triacetyl cellulose to make the rodlike compound aligned randomly and homogeneously is laminated upon a supporting body made of a cycloolefin polymer having excellent water permeability can be given, for instance.

3. Retardation Film

The retardation film of this embodiment may have other layer than the substrate and the retardation layer mentioned above. As such other layer, a reflection preventing layer, an ultraviolet ray absorbing layer, an infrared ray absorbing layer, a charge preventing layer, etc. can be given by example.

Since the reflection preventing layer, the ultraviolet ray absorbing layer, the infrared ray absorbing layer, the charge preventing layer, etc. are identical with those described in the section "A. Optical functional film", explanation is omitted here.

The thickness of the retardation film of this embodiment is not particularly limited, so long as it is in such a range to exhibit the desired optical characteristics. Ordinary, it is preferably in a range of 20 μm to 150 μm, particularly preferably in a range of 25 μm to 130 μm, and most preferably in a range of 30 μm to 110 μm.

Further, in the retardation film of this embodiment, the haze value measured according to JIS K7105 is preferably in a range of 0% to 2%, particularly preferably in a range of 0% to 1.5%, and most preferably in a range of 0% to 1%.

The retardation in the thickness direction of the retardation film of this embodiment may be appropriately selected depending upon the application of this embodiment, etc., and is not particularly limited. Specifically, in this embodiment, the retardation in the thickness direction (Rth) is preferably in a range of 60 nm to 450 nm, more preferably in a range of 70 nm to 400 nm, and particularly preferably in a range of 80 nm to 350 nm. This is because, when the retardation in the thickness direction (Rth) is in the above range, the retardation film of this embodiment can be made suitable for improving the viewing angle characteristics of the liquid crystal display of the VA (Vertical Alignment) system.

Further, the in-plane retardation (Re) of the retardation film of this embodiment may be appropriately selected depending upon the application of the retardation film of this embodiment, etc., and is not particularly limited. Specifically, in this embodiment, the in-plane retardation (Re) is preferably in a range of 20 nm to 150 nm, more preferably in a range of 30 nm to 130 nm, and particularly preferably in a range of 40 nm to 110 nm. When the in-plane retardation (Re) is in the above range, the retardation film of this embodiment can be used as a retardation film suitable for improving the viewing angle characteristics of the liquid crystal display of the VA (Vertical Alignment) system.

The in-plane retardation (Re) value may be dependent upon the wavelengths. For example, the value may be greater on the longer wavelength side than on the shorter wavelength side, or the value may be greater on the shorter wavelength side than on the longer wavelength side. When the in-plane retardation (Re) value has such wavelength dependency, the viewing angle characteristics of the liquid crystal display can be improved over the entire visible light zone.

The application of the retardation film of this embodiment is not particularly limited. For example, an optical compensator (for example, a viewing angle compensator), an elliptical polarizing plate, a luminance improving plate, etc. used in the liquid crystal display can be cited. In particular, the retardation film of this embodiment can be favorably used as the optical compensator for improving the viewing angle dependency of the liquid crystal display. Further, since the retardation film of this embodiment has the property as the A plate or the B plate and the property as the negative C-plate, it can be used most favorably as the optical compensator for the liquid crystal display of the VA system.

Figure 5A:
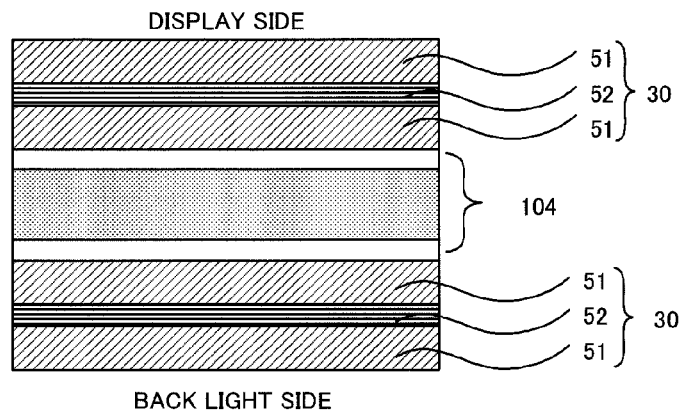
FIGS. 5A to 5C are each a schematically sectional view showing another example of a use embodiment of the optical functional film of the present invention.

A mode in which the retardation film of this embodiment is used as the optical compensator of the liquid crystal display of the VA system is not particularly limited, so long as desired viewing angle characteristics are obtained. The mode in which the retardation film of this embodiment is used as the optical compensator of the liquid crystal display of the VA system will be concretely explained with reference to the drawings. FIG. 5 give schematic views illustrating modes in which the retardation film of this embodiment is used as the optical compensator of the liquid crystal display of the VA system. FIG. 5A is a schematically sectional view showing an example of a general liquid crystal display of the VA system without use of the retardation film of this embodiment. As shown in FIG. 5A, the general liquid crystal display has a configuration in which a liquid crystal cell 104 is sandwiched by two polarizing plates 30. The polarizing plate 30 takes a form in which films for protecting a polarizing plate 51 are laminated on opposite faces of the polarizer 52.

Figure 5B:
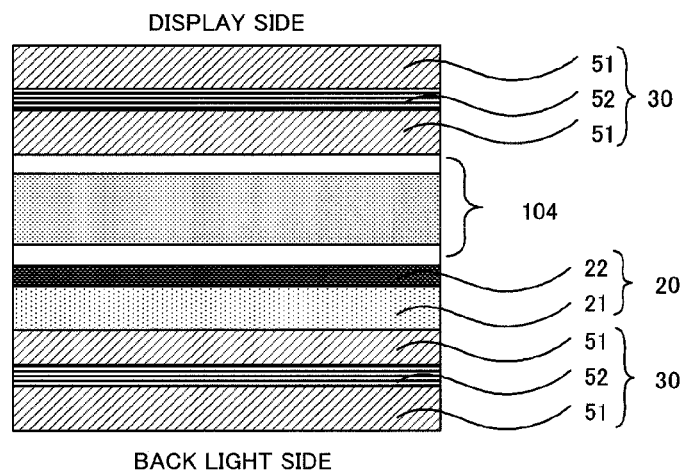

FIG. 5B is a schematically sectional view showing an example of a liquid crystal display using the retardation film of this embodiment. As shown in FIG. 5B, an example in which the retardation film 20 of this embodiment is laminated between a liquid crystal cell 104 and a polarizing plate 30 on a back light side can be given as a mode in which the retardation film of this embodiment is used as an optical compensator. This mode has the merit that parts having been used in the conventional liquid crystal display can be used as they are.

Figure 5C:
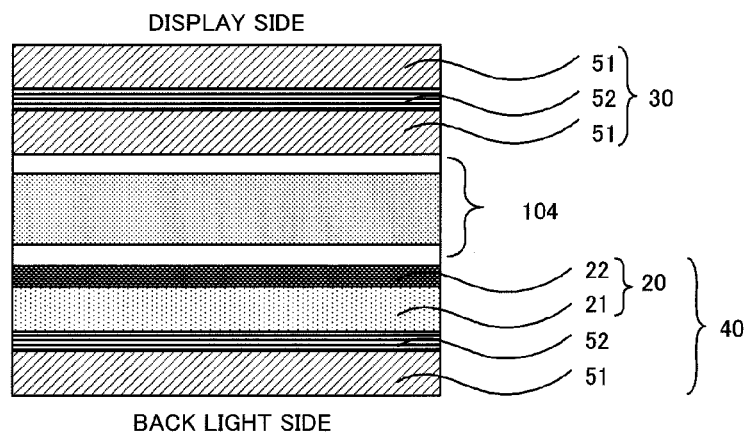
Figure 6:
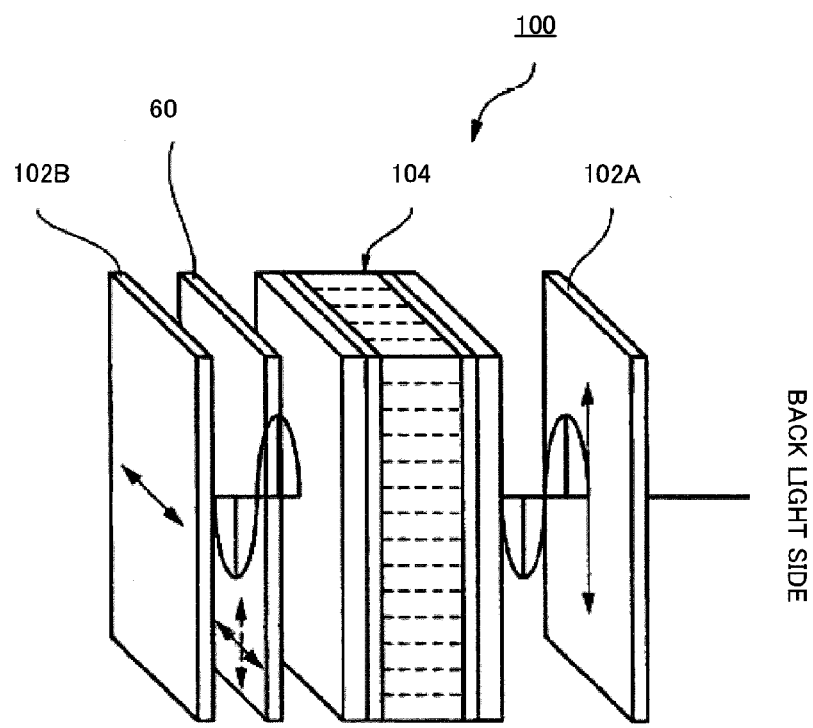
FIG. 6 is a schematically sectional view showing one example of a general liquid crystal display.

FIG. 5C is a schematically sectional view showing other example of a liquid crystal display using the retardation film of this embodiment. As shown in FIG. 5C, an example in which the retardation film 20 of this embodiment is used in place of the film for protecting a polarizing plate constituting the polarizing plate 31 on a back light side can be given as a mode in which the retardation film 20 of this embodiment is used as an optical compensator. According to such an example, since the retardation film of this embodiment can perform the function as the optical compensator for improving the viewing angle dependency and the function as the film for protecting a polarizing plate, the liquid crystal display can be further thinned.

Further, the retardation film of this embodiment can be used for an application as the polarizing film by bonding it to a polarizing layer. Although the polarizing film ordinarily comprises a polarizing layer and protective layers formed on opposite faces thereof. Meanwhile, according to this embodiment, when the above-mentioned retardation film is employed as the protective layer on one of the faces, for example, the polarizing film having the optically compensating function can be obtained for improving the viewing angle characteristics of the liquid crystal display, for example.

Although not limited, as the above polarizing layer, an iodine based polarizing layer, a dye based polarizing layer using a dichromatic dye, a polyene based polarizing layer, etc. can be used, for example. The iodine based polarizing layer and the dye based polarizing layer are generally produced by using polyvinyl alcohol.

4. Producing Method of the Retardation Film

Next, a producing method of the retardation film of this embodiment will be explained. The producing method of the retardation film of this embodiment is not particularly limited, so long as it can form the retardation layer having the random homogeneous alignment on the substrate. Ordinarily, a method is used, which applies a retardation layer-forming composition prepared by dissolving the rodlike compound in a solvent onto the substrate. Since the rodlike compound can be impregnated into the substrate together with the solvent by such a method, the interaction between the rodlike compound and a material constituting the substrate can be strengthened, so that the random homogeneous alignment of the rodlike compound is easily formed. In the following, the producing method of such a retardation film will be explained.

The retardation layer-forming composition ordinarily comprises the rodlike compound and the solvent, and may contain other compound, if necessary. Note that the rodlike compound used in the retardation layer-forming composition and the substrate are identical with those explained in the sections "1. Retardation layer" and "2. Substrate", and thus explanation is omitted here.

The solvent used in the retardation layer-forming composition is not particularly limited, so long as it can dissolve the rodlike compound at a desired concentration, and does not erode the substrate.

Here, as the solvent used in this embodiment, those identical with the solvents explained to be employed in the composition for forming an optical functional layer in the section "A. Optical functional film" can be used, and thus explanation is omitted.

The content of the rodlike compound in the retardation layer-forming composition is not limited, so long as it is in such a range as to set the viscosity of the retardation layer-forming composition at a desired value depending upon the coating method for forming the retardation layer on the substrate by coating, etc. Especially, in this embodiment, the content of the rodlike compound in the retardation layer-forming composition is preferably in a range of 10 mass % to 30 mass %, particularly preferably in a range of 10 mass % to 25 mass %, and most preferably in a range of 10 mass % to 20 mass %.

A photopolymerization initiator may be included in the retardation layer-forming composition, if needed. Particularly when the retardation layer is cured by irradiation with ultraviolet rays, the photopolymerization initiator is preferably included. Further, when the photopolymerization initiator is used, a photopolymerization initiator ancillary agent can be used in combination.

Here, as the photopolymerization initiator and the photopolymerization initiator ancillary agent to be used in the present invention, those identical with what are explained as the photopolymerization initiator and the photopolymerization initiator ancillary agent to be used in the composition for forming an optical functional layer in the section "A. Optical functional film" can be used, and thus explanation is omitted here.

In the retardation layer-forming composition, the following compounds may be added in the range not to deteriorate the purpose of the present embodiment. As the compound to be added, for example, polyester (meth)acrylate obtained by reacting (meth)acrylic acid with a polyester prepolymer obtained by condensation of a polyhydric alcohol and a monobasic acid or a polybasic acid; polyurethane(meth)acrylate obtained by reacting a polyol group and a compound having two isocyanate groups, and reacting the reaction product with (meth)acrylic acid; a photo polymerizable compound such as epoxy(meth)acrylate obtained by reacting (meth)acrylic acid with epoxy resins such as a bisphenol A type epoxy resin, a bisphenol F type epoxy resin, a novolak type epoxy resin, polycarboxylic acid glycidyl ester, polyol glycidyl ether, an aliphatic or alicyclic epoxy resin, an amino group epoxy resin, a triphenol methane type epoxy resin, and a dihydroxy benzene type epoxy resin; or a photo polymerizable liquid crystalline compound having an acrylic group or a methacrylic group can be presented. The addition amount of these compounds with respect to the retardation layer-forming composition can be determined in the range not to deteriorate the purpose of the present embodiment. Since the compounds mentioned above are added, the mechanical strength of the retardation layer to be formed using the retardation layer-forming composition of the present invention can be improved so that the stability may be improved.

The coating method for coating the retardation layer-forming composition onto the alignment layer is not particularly limited, so long as it can accomplish a desired flatness.

Here, since the coating method used in this method is identical with that explained as the method for coating the composition for forming an optical functional layer in the section "A. Optical film", explanation is omitted.

The thickness of the coated film of the retardation layer-forming composition is not particularly limited as long as it is in the range capable of achieving a desired flatness. In general, it is in the range of 0.1 μm to 50 μm; it is more preferably in the range of 0.5 μm to 30 μm; and it is particularly preferably in the range of 0.5 μm to 10 μm. In the case the thickness of the coated film of the retardation layer-forming composition is thinner than the above-mentioned range, the flatness of the retardation layer may be deteriorated. Moreover, in the case the thickness is thicker than the above-mentioned range, due to the increase of the dry load of the solvent, the productivity may be lowered.

Since the method for drying the coated film of the retardation layer-forming composition is identical with that explained as the coating method for drying the coated film of the optical function layer-forming composition in the section "A. Optical functional film", explanation is omitted here.

In the case of using a polymerizable material as the rodlike compound, the method for polymerizing the polymerizable material can be determined optionally according to the kind of the polymerizable functional group of the polymerizable material. In particular, in the present embodiment, a method of curing the material by the active radiation is preferable. The active radiation is not particularly limited as long as it is a radiation capable of polymerizing the polymerizable material. In general it is preferable to use a ultraviolet ray or a visible light beam in terms of the device convenience, or the like. In particular, it is preferable to use an irradiation beam having a 150 nm to 500 nm wavelength, more preferably 250 nm to 450 nm, and further preferably 300 nm to 400 nm.

A light source of the irradiation light is identical with that described in the section "A. Optical functional film", and thus explanation is omitted here.

C. Composition for Forming an Optical Functional Layer

Next, the composition for forming an optical functional layer of the present invention will be explained. The composition for forming an optical functional layer of the present invention is characterized in that it comprises the rodlike compound and a mixed solvent composed of an alcoholic solvent and another organic solvent, and the content of the alcoholic solvent in the mixed solvent is in a range of 5 mass % to 20 mass %.

According to the present invention, since the alcoholic solvent is contained in the mixed solvent in the above range, the optical functional layer having excellent transparency can be obtained free from clouding, when the optical functional layer is formed by using the composition for forming an optical functional layer of the present invention.

A mechanism by which, when the alcoholic solvent is contained in the mixed solvent in the above range in the composition for forming an optical functional layer of the present invention, the clouding is suppressed is not clear, but it is considered to be based on the following mechanism. That is, since the rodlike compound contained in the composition for forming an optical functional layer of the present invention is insoluble in the alcoholic solvent, the presence of the alcoholic solvent in the mixed solvent can promote the in-plane alignment of the rod-like compound, when the optical functional layer is formed by using the composition for forming an optical functional layer of the present invention. It is considered that for such a reason, the poor alignment of the rodlike compound can be suppressed, and consequently the optical functional layer can be prevented from being clouded.

In the present invention, the content of the alcoholic solvent in the mixed solvent is specified to be in the range of 5 mass % to 20 mass %. The reason why it is specified to be in this range is as follows. That is, if the content of the alcoholic solvent is less than the above range, the optical functional layer can be clouded, when the optical functional layer is formed by using the composition for forming an optical functional layer of the present invention. On the other hand, if the content of the alcoholic solvent is more than the above range, the rodlike compound mentioned later may not be dissolved at a desired concentration in the composition for forming an optical functional layer of the present invention.

Meanwhile, the content of the alcoholic solvent in the mixed solvent in the present invention can be measured by gas chromatography. As to the measuring condition of such a gas chromatography, for instance, the following condition can be given by example.

(1) Measuring apparatus: Shimadzu Corporation
(2) Detector: FID
(3) Column: SBS-200 3 m
(4) Column temperature: 100° C.,
(5) Injection temperature: 150° C.,
(6) Carrier gas: He 150 kPa
(7) Hydrogen pressure: 60 kPa
(8) Air pressure: 50 kPa The composition for forming an optical functional layer of the present invention is preferably used to form the optical functional layer in which the rodlike compound forms the random homogeneous alignment. Since the optical functional layer in which the rodlike compound forms the random homogeneous alignment excellently exhibits the optical characteristics to function the negative C-plate, the optical functional layer which excellently exhibits the optical characteristics can be formed without using the alignment film. Further, since the alignment film is unnecessary, when the optical functional layer is formed directly on the substrate by using the composition for forming an optical functional layer of the present invention, the optical functional film having an excellent adhesion property between the substrate and the optical functional layer can be obtained.

The random homogeneous alignment is that one of alignment forms of the rodlike compound which gives the optical characteristics as the negative C-plate to the optical functional layer formed by using the composition for forming an optical functional layer of the present invention. In general, the alignment form of the rodlike compound to exhibit the optical characteristics as the negative C-plate has been formerly that having the cholesterolic structure, but the random homogeneous alignment is characterized by having no cholesterolic structure.

Here, since the random homogeneous alignment is identical with that explained in the section "A. Optical functional film", explanation is omitted here.

The composition for forming an optical functional layer of the present invention comprises the rodlike compound and the mixed solvent composed of the alcoholic solvent and other organic solvent. In the following, each of the components of the composition for forming an optical functional layer of the present invention will be explained in detail.

1. Mixed Solvent

First, the mixed solvent constituting the composition for forming an optical functional layer of the present invention will be explained. The mixed solvent used in the present invention comprises the alcoholic solvent and other organic solvent.

(1) Alcoholic Solvent

The alcoholic solvent used in the mixed solvent will be explained. The alcoholic solvent used in the present invention has the function to prevent the optical functional layer from being clouded, when the optical functional layer is formed by using the composition for forming an optical functional layer of the present invention.

The content of the alcoholic solvent in the mixed solvent in the present invention is not particularly limited, so long as it is in a range of 5 mass % to 20 mass %. Particularly, the content is preferably in a range of 10 mass % to 20 mass % in the present invention. Here, a method for quantitatively determine the content of the alcoholic solvent is identical with that mentioned above, and thus explanation is omitted here.

The alcoholic solvent used in the present invention is not particularly limited, so long as it does not erode the substrate mentioned later. Such an alcoholic solvent is not limited to one kind alone, but two kinds or more may be used in a mixed state.

The alcoholic solvent used in the present invention may be a monovalent alcohol in which the number of OH group contained in a molecule is one or a polyvalent alcohol in which the number of OH groups is two or more. Particularly, the monovalent alcohol is preferably used.

Further, the alcoholic solvent used in the present invention may be any of a primary alcohol, a secondary alcohol and a tertiary alcohol. Among them, the primary alcohol is preferably used.

Further, as the alcoholic solvent used in the present invention, mention may be made of an aliphatic saturated alcohol, an aliphatic unsaturated alcohol, an alicyclic alcohol, an aromatic alcohol and a heterocyclic alcohol, for example. In the present invention, the aliphatic saturated alcohol is preferably used.

As the aliphatic saturated alcohol, a lower aliphatic saturated alcohol is preferably used, and more concretely the number of carbons constituting the hydrocarbon chain is preferably in a range of 1 to 6, particularly preferably in a range of 3 to 5. As the lower aliphatic saturated alcohol having the above number of the carbons, ones with straight hydrocarbon chains and other with side chains can be recited, and any of the lower aliphatic saturated alcohols can be favorably used in the present invention.

Among the alcoholic solvents, as specific examples of the alcoholic solvents preferably used in the present invention, methanol, ethanol, N-propyl alcohol, i-propyl alcohol, n-butyl alcohol, i-butyl alcohol, etc. can be recited. Particularly, isopropyl alcohol and N-propyl alcohol are more preferably used in the present invention.

(2) Organic Solvent

Next, the organic solvent constituting the mixed solvent in the present invention will be explained. The organic solvent in the present invention has a function to solve the below-described rodlike compound at a desired concentration. The organic solvent used in the present invention may be a single solvent or a mixed solvent of plural solvents.

The organic solvent used in the present invention is not particularly limited, so long as it can dissolve the below-mentioned rodlike compound at the desired concentration. As the organic solvent used in the present invention, mention may be made of hydrocarbon-based solvents such as benzene, hexane, etc.; ketone-based solvents such as methyl ethyl ketone, methyl isobutyl ketone, cyclohexanone, methylcyclohexanone, etc.; ether-based solvents such as tetrahydrofuran, 1,2-dimethoxyethane, etc.; halogenated alkyl-based solvents such as chloroform, dichlorometahne, etc.; ester-based solvents such as methyl acetate, butyl acetate, propylene glycol monomethyl ether acetate, etc.; amide-based solvents such as N,N-dimethyl formamide, etc.; and sulfoxide-based solvents such as dimethylsulfoxide, etc., for example. Among them, methyl ethyl ketone, methyl isobutyl ketone, cyclohexanone and methyl cyclohexanone can be favorably used.

2. Rodlike Compound

Next, the rodlike compound constituting the composition for forming an optical functional layer of the present invention will be explained. The rodlike compound used in the present invention is not particularly limited, so long as it can give desired optical characteristics to the optical functional layer formed by using the composition for forming an optical functional layer of the present invention.

Here, the rod-like compound used in the present invention is identical with that explained in the section "A. Optical functional film", and thus explanation is omitted here.

The content of the rodlike compound in the composition for forming an optical functional layer of the present invention is not particularly limited, so long as it is in such a range as to set the composition for forming an optical functional layer of the present invention at a desired viscosity, depending upon a forming method for forming the optical functional layer by using the composition for forming an optical functional layer of the present invention. Particularly, in the present invention, the content of the rodlike compound in the composition for forming an optical functional layer is preferably in a range of 5 mass % to 50 mass %, particularly preferably in a range of 5 mass % to 20 mass %.

Meanwhile, the content of the rodlike compound is determined by weighing 2 g of the composition for forming an optical functional layer of the present invention into an aluminum cup, drying it at 150° C., in an oven for one hour, and then making a calculation based on a volatilization weight loss.

3. Composition for Forming an Optical Functional Layer

The composition for forming an optical functional layer of the present invention may comprise other component than the above mixed solvent and the above rodlike compound. As such other component, silicon-based leveling agents such as polydimethyl siloxane, methylphenyl siloxane, organic denatured siloxane, etc.; straight-chain polymers such as poly(alkyl acrylate), poly(alkyl vinylether), etc.; surface active agents such as a fluorine-based/surface active agent, a hydrocarbon-based surface active agent, etc.; fluorine-based leveling agents such as tetrafluoroethylene, etc.; a photopolymerization initiator, etc. can be recited, for example. Particularly, when a rodlike compound having a polymerizable functional group which is polymerized by irradiation with light is used as the rodlike compound, the photopolymerization initiator is preferably contained in the present invention.

Here, the photopolymerization initiator used in the present invention is identical with that described in the section "A. Optical functional film", and thus explanation is omitted here.

The content of the photopolymerization initiator is not particularly limited, so long as it is in such a range as to enable the polymerization of the rodlike compound within a desired time period. Ordinary, the content is preferably in a range of 1 weight part to 10 weight parts, and particularly preferably in a range of 3 weight parts to 6 weight parts with respect to 100 weight parts of the rodlike compound. If the content of the photopolymerization initiator is greater than the above range, there is a fear that the alignment of the rodlike compound is disturbed in the optical functional layer formed by using the composition for forming an optical functional layer of the present invention. In addition, if the content is smaller than the above range, there is the possibility that the polymerization cannot be performed within the desired time period depending upon the kind of the rodlike compound.

When the photopolymerization initiator is used, a photopolymerization initiation ancillary agent can be used in combination. Such a photopolymerization initiator ancillary agent is identical with that described in the section "A. Optical functional film", and thus explanation is omitted here.

Further, other compound than mentioned above can be used in the composition for forming an optical functional layer of the present invention, so long as it does not damage the object of the present invention. Such other compound is identical with that explained in the section "A. Optical functional film", and thus explanation is omitted here.

The viscosity of the composition for forming an optical functional layer of the present invention may be arbitrarily adjusted, depending upon the method for forming the optical functional layer by using the composition for forming an optical functional layer of the present invention, etc. Ordinarily, the viscosity is preferably in a range of 0.5 mPa·s to 10 mPa·s, more preferably in a range of 1 mPa·s to 5 mPa·s, and most preferably in a range of 1 mPa·s to 3 mPa·s at 25° C.

The application of the composition for forming an optical functional layer of the present invention is not particularly limited, but it is preferably used to form an optical functional layer for constituting an optical functional film to be used in the liquid crystal display. Particularly, the composition is most preferably used to form the optical functional layer in which the rodlike compound contained in the composition for forming an optical functional layer of the present invention forms the random homogeneous alignment. Details of such a random homogeneous alignment are as mentioned above, and thus explanation is omitted here.

The producing method the composition for forming an optical functional layer of the present invention is not particularly limited, so long as it is a method capable of manufacturing the composition for forming an optical functional layer having the above configuration. A method used as an ordinary method used for producing an organic solvent-based composition can be applied. As such a method, a method for dissolving the rodlike compound, etc. into the mixed solvent containing the alcoholic solvent in the above range at their respective predetermined concentrations can be given, for example.

D. Producing Method of the Optical Functional Film

Next, a producing method of the optical functional film of the present invention will be explained. The optical functional film-producing method of the present invention is characterized by using a substrate having the property as the negative C-plate and the above composition for forming an optical functional layer, coating the composition for forming an optical functional layer on the substrate, and thus producing the optical functional film comprising the substrate, and the rodlike compound, which forms the random homogeneous alignment, formed directly on the substrate.

According to the present invention, the optical functional film having the optical functional layer with excellent transparency can be produced by forming the optical functional layer with use of the above composition for forming an optical functional layer containing the alcoholic solvent.

In addition, according to the present invention, the optical functional film having an excellent adhesion property between the optical functional layer and the substrate can be produced by forming the optical functional layer directly on the substrate. It is considered that the adhesion force between the substrate and the optical functional layer can be improved by forming the latter directly on the former through the following mechanism. That is, when the optical functional layer is formed directly on the substrate, the rodlike compound contained in the optical functional layer can penetrate into the substrate from the surface thereof. Consequently, there is no clear interface at a bonding portion between the substrate and the optical functional layer, but it is in a "mixed" state between them. Therefore, it is considered that the adhesion property is conspicuously improved as compared with the conventional bonding caused by interface interaction.

In addition, in the case of the conventional optical functional film with the configuration having the alignment film, there were problems that light underwent the multiple reflections and interference fringes occurred at the interface between the alignment film and the optical functional layer and between the alignment film and the substrate. However, the optical functional film produced by the present invention has no such an alignment film, and the bonding portion between the substrate and the optical functional layer is in the "mixed" state, so no clear interface exists. Therefore, the optical functional film of the present invention has the merit that the above multiple reflections do not occur, and that it is free from the degradation in quality with the interference fringes.

Further, according to the present invention, since the rodlike compound forms the random homogeneous alignment in the optical functional layer, the optical functional film which excellently exhibits the optical characteristics, particularly the optical characteristics to function as the negative C-plate can be produced without using the alignment film.

The producing method of the optical functional film of the present invention uses the substrate and the composition for forming an optical functional layer. In the following, the producing method of the optical functional film according to the present invention will be explained in detail.

Note that the composition for forming an optical functional layer used in the present invention is identical with that described in the section "A. Composition for forming an optical functional layer", and thus explanation is omitted here.

1. Substrate

Next, the substrate used in the present invention will be explained. The substrate used in the present invention has the function as the negative C-plate. Further, as mentioned later, since the optical functional layer obtained by the producing method of the optical functional film is formed directly on the substrate in the optical functional film of the present invention, the rodlike compound contained in the optical functional layer forms the random homogeneous alignment. Therefore, the substrate used in the present invention has a function as a so-called alignment film for making the rodlike compound form the random homogeneous alignment. In the following, the substrate used in the present invention will be explained.

The substrate used in the present invention is not particularly limited, so long as it has the property as the optically negative C-plate. Here, that "has the property as the optically negative C-plate" in the present invention means that the relationship: $Nx=Ny>Nz$ is satisfied in which $Nx$ and $Ny$ are respectively the refractive index in arbitrary x-direction and y-direction in the plane of the substrate sheet, and $Nz$ is the refractive index in the thickness direction.

The substrate having the property as the negative C-plate is used as the substrate in the present invention for the following reason. That is, as mentioned above, the substrate in the present invention functions as the so-called alignment film for making the rodlike compound form the random homogeneous alignment. If the substrate does not have the property as the negative C-plate, the rodlike compound cannot form the random homogeneous alignment.

In the present invention, the mechanism in which the rodlike compound forms the random homogeneous alignment when the optical functional layer is formed, by using the composition for forming an optical functional layer, on the substrate having the property as the negative C-plate is the same as those explained in the section "A. Optical functional film", and thus explanation thereof is omitted here.

It is considered that the substrate has the function as the alignment film for making the rodlike compound form the random homogeneous alignment through the above-mentioned mechanism. Therefore, the substrate used in the present invention must have an alignment controlling power to the rodlike compound, and take a configuration in which that material constituting the substrate which exhibits the property as the negative C-plate must be present at the surface of the substrate. Accordingly, even if the substrate has the property as the negative C-plate, that configuration cannot be used as the substrate in the present invention, in which when the optical functional layer is formed on the substrate, the rodlike compound cannot contact that material constituting the substrate which has the alignment controlling power to the rodlike compound.

As such a substrate being unable to be used in the present invention, for example, mention may be made of a substrate having a configuration that a supporting body having a construction made of a polymer material alone and having the property as the negative C-plate is laminated with a retardation layer containing an optically anisotropic material with a refractive index anisotropic property. In the substrate having such a configuration, the polymer material constituting the supporting body is that material constituting the substrate which has the alignment controlling power to the rodlike compound. However, when the above optical functional layer is formed on the substrate, the rodlike compound cannot contact the polymer material due to the presence of the retardation layer. Therefore, the substrate having such a configuration is not included in the substrate of the present invention, even if the substrate has the property as the negative C-plate.

The property of the negative C-plate of the substrate used in the present invention may be appropriately selected depending upon the kind of the rodlike compound used in the composition for forming an optical functional layer, the optical characteristics required for the optical functional film produced in the present invention, etc. Especially, in the present invention, the retardation in the thickness direction (Rth) of the substrate is preferably in a range of 20 nm to 100 nm, particularly preferably in a range of 25 nm to 80 nm, and most preferably in a range of 30 nm to 60 nm in that range. This is because, when the retardation in the thickness direction (Rth) of the substrate is in the above range, the random homogeneous alignment is easily formed in the optical functional layer of the optical functional film produced by the present invention, irrespective of the kind of the rodlike compound. Further, when the Rth of the substrate is in the above range, the rodlike compound can form the random homogeneous alignment having a uniform quality.

Here, the above value in the thickness direction (Rth) is a retardation value represented by a formula: $Rth=\{(Nx+Ny)/2-Nz\}\times d$ in which Nx and Ny are respectively the refractive index in the leading phase axis direction (the direction with the smallest refractive index) and the refractive index in the lagging phase axis direction (the direction with the largest refractive index) in the plane of the substrate used in the present invention, Nz is a refractive index in the thickness direction, and "d" is the thickness (nm) of the substrate. As the retardation (Rth) value in the present invention, a value measured by the KOBRA-WR manufactured by Oji Scientific Instruments is used.

Further, from the standpoint that the optical functional layer having the rodlike compound which is aligned randomly and homogeneously with a more uniform quality is formed on the substrate in the present invention, in addition to the retardation in the thickness direction (Rth) being in the above range, the in-plane retardation (Re) is preferably in a range of 0 nm to 300 nm, particularly preferably in a range of 0 nm to 150 nm, and most preferably in a range of 0 nm to 125 nm.

Here, the above in-plane retardation Re is a value expressed by a formula: $Re=(Nx-Ny)\times d$ in which Nx and Ny are respectively the refractive index in the leading phase axis direction (the direction with the smallest refractive index) and the refractive index in the lagging phase axis direction (the direction with the largest refractive index) in the plane of the substrate used in the present invention, and "d" is the thickness (nm) of the retardation layer. As the in-plane retardation (Re) value in the present invention, a value measured at room temperature by the KOBRA-WR manufactured by Oji Scientific Instruments is used.

The transparency of the substrate used in the present invention may be determined optionally according to the transparency required to the optical functional film produced in the present invention, or the like. In general, it is preferable that the transmittance in a visible light zone is 80% or more, and it is more preferably 90% or more. This is because, if the transmittance is low, the selection ranges in the rodlike compound and the like becomes narrow. Here, the transmittance of the substrate can be measured according to the JIS K7361-1 (Testing method of the total light transmittance of a plastic-transparent material).

The thickness of the substrate used in the present invention is not particularly limited as long as necessary self supporting properties can be obtained according to the application of the optical functional film produced in the present invention, or the like. In general, it is preferably in the range of 10 μm to 188 μm; it is more preferably in the range of 20 μm to 125 μm; and it is particularly preferably in the range of 30 μm to 80 μm. In the case the thickness of the substrate is thinner than the above-mentioned range, the necessary self supporting properties may not be provided to the optical functional film of the present invention. Moreover, in the case the thickness is thicker than the above-mentioned range, for example, at the time of cutting process of the optical functional film of the present invention, the process waste may be increased or wear of the cutting blade may be promoted.

Further, the substrate used in the present invention is not particularly limited, so long as it possesses the optical characteristics. Since the material constituting such a substrate is the same as explained in the section "A. Optical functional film", explanation is omitted here.

The substrate used in this invention is preferably subjected to a drawing treatment. This is because, when the substrate is subjected to the drawing treatment, the rodlike compound can easily penetrate into the substrate to attain excellent adhesion property between the substrate and the retardation layer. As a result, the rodlike compound can form the random homogeneous alignment having a more uniform quality.

The above drawing treatment is not particularly limited, and may be determined arbitrarily depending upon the material constituting the substrate, etc. As such a drawing treatment, a uniaxial drawing treatment and a biaxial drawing treatment can be given by example. Among them, the biaxial drawing treatment is preferable as the drawing treatment applied in the present invention.

The drawing method in the biaxial drawing treatment is not particularly limited, so long as it can impart the desired property as the negative C-plate to the substrate. In the present invention, any drawing method such as a roller drawing method, a long-gap extension drawing method, a tenter drawing method, a tubular drawing method or the like can be appropriately used. In the drawing treatment, the polymer film is preferably heated at not less than the glass transition temperature and not more than the melting point, for example.

The configuration of the substrate in the present invention is not limited to a single layer configuration, but it may have a configuration in which plural layers are laminated. When the substrate has the configuration in which the plural layers are laminated, the layers having the same composition may be laminated, or the plural layers having different compositions may be laminated.

As the configuration of the substrate in which the plural layers having the different compositions are laminated, an example in which a film made of a material such as triacetyl cellulose to make the rodlike compound aligned randomly and homogeneously is laminated upon a supporting body made of a cycloolefin polymer having excellent water permeability can be given, for instance.

2. Producing Method of the Optical Functional Film

Next, the producing method of the optical functional film in the present invention by using the composition for forming an optical functional layer and by forming the optical functional layer on the substrate will be explained. Meanwhile, in the optical functional film-producing method of the present invention, the optical functional layer is formed by coating the composition for forming an optical functional layer directly on the substrate.

As the coating method for coating the composition for forming an optical functional layer onto the substrate is not particularly limited as long as it is a method capable of achieving a desired flatness. As the method, for example, the gravure coating method, the reverse coating method, the knife coating method, the dip coating method, the spray coating method, the air knife coating method, the spin coating method, the roll coating method, the printing method, the dipping and pulling up method, the curtain coating method, the die coating method, the casting method, the bar coating method, the extrusion coating method, or the E type applying method can be presented, but it is not restricted thereto.

The thickness of the coated film of the composition for forming an optical functional layer is not particularly limited as long as it is in the range capable of achieving a desired flatness. In general, it is in the range of 0.1 µm to 50 µm; it is more preferably in the range of 0.5 µm to 30 µm; and it is particularly preferably in the range of 0.5 µm to 10 µm. In the case the thickness of the coated film of the composition for forming an optical functional layer is thinner than the above-mentioned range, the flatness of the optical functional layer to be formed may be deteriorated. Moreover, in the case the thickness is thicker than the above-mentioned range, due to the increase of the dry load of the solvent, the productivity may be lowered.

As the method for drying the coated film of the composition for forming an optical functional layer, a commonly used drying method such as the heat drying method, the pressure reducing drying method, and the gap drying method can be used. Moreover, the drying method in the present invention is not limited to a single method. For example, a plurality of drying methods may be adopted by an embodiment such as of changing the drying methods successively according to the residual solvent amount.

In the case of using a polymerizable material as the rodlike compound, the method for polymerizing the polymerizable material can be determined optionally according to the kind of the polymerizable functional group of the polymerizable material. In particular, in the present invention, a method of curing the material by the active radiation is preferable. The active radiation is not particularly limited as long as it is a radiation capable of polymerizing the polymerizable material. In general it is preferable to use an ultraviolet ray or a visible light beam in terms of the device convenience, or the like. In particular, it is preferable to use an irradiation beam having a 150 nm to 500 nm wavelength, more preferably 250 nm to 450 nm, and further preferably 300 nm to 400 nm.

As the light source for the irradiation beam, for example a low pressure mercury lamp (a sterilizing lamp, a fluorescent chemical lamp, a black light), a high pressure discharge lamp (a high pressure mercury lamp, a metal halide lamp), or a short arc discharge lamp (a ultra high pressure mercury lamp, a xenon lamp, a mercury xenon lamp) can be presented. In particular, use of such as the metal halide lamp, the xenon lamp, or the high pressure mercury lamp can be recommended. Moreover, the irradiation can be carried out while optionally adjusting the irradiation intensity according to such as the content of the photo polymerization initiating agent.

3. Optical Functional Film

Lastly, the optical functional film produced by the optical functional film-producing method of the present invention will be explained. The optical functional film produced by the present invention comprises the substrate and the optical functional layer formed directly on the substrate. In the optical functional layer, the rodlike compound forms the random homogeneous alignment.

Since the optical functional layer is formed by using the above composition for forming an optical functional layer, the optical functional film produced by the present invention has excellent transparency.

The optical functional film produced by the present invention is characterized by having the merit that when it is used for an application as an optical compensation film for the liquid crystal display, less fringes or clouding occurs and high displaying quality can be realized.

Further, the optical functional film produced by the present invention has the merit that since the substrate and the optical functional layer can be firmly adhered by forming the optical functional layer directly on the substrate, the delamination or the like does not occur with lapse of time.

Furthermore, since the rodlike compound forms the random homogeneous alignment in the optical functional layer, the optical functional film produced by the present invention excellently exhibits the optical characteristics to function as the negative C-plate.

In the following, the optical functional film produced by the optical functional film-producing method of the present invention will be explained in detail. Note that the random homogeneous alignment in the present invention is identical with that explained in the section "A. Optical functional film", and thus explanation is omitted here.

The thickness of the optical functional film produced by the present invention is not particularly limited, so long as it is in such a range as to exhibit the desired optical characteristics. Ordinary, it is preferably in a range of 30 µm to 200 µm, particularly preferably in a range of 30 µm to 150 µm, and most preferably in a range of 30 µm to 100 µm.

Moreover, in the optical functional film produced by the present invention, the haze value measured according to JIS K7105 is preferably in a range of 0.1% to 5%, particularly in a range of 0.1% to 1%, and most preferably in a range of 0.1% to 0.5%.

The retardation in the thickness direction (Rth) of the optical functional film produced by the present invention may be appropriately selected depending upon the application of the optical functional film, etc., and is not particularly limited. Especially, in the present invention, the retardation in the thickness direction (Rth) is preferably in a range of 50 nm to 500 nm, more preferably in a range of 100 nm to 400 nm, and particularly preferably in a range of 100 nm to 400 nm. Since the retardation in the thickness direction (Rth) is in the above range, the optical functional film produced by the present invention can be made suitable for improving the viewing angle characteristics of the liquid crystal display of the VA (Vertical Alignment) system. Here, the definition and the measuring method of the retardation in the thickness direction (Rth) are identical with those explained in the section "1. Substrate", and thus explanation is omitted here.

In addition, the in-plane retardation (Re) of the optical functional film produced by the present invention may be appropriately selected depending upon the application of the optical functional film, etc., and is not particularly limited. Especially, in the present invention, the in-plane retardation (Re) is preferably in a range of 0 nm to 5 nm, more preferably in a range of 0 nm to 3 nm, and particularly preferably in a range of 0 nm to 1 nm. Since the in-plane retardation (Re) is in the above range, the optical functional film produced by the present invention can be used as a retardation film suitable for improving the viewing angle characteristics of the liquid crystal display of the VA (Vertical Alignment) system.

Here, the definition and the measuring method of the in-plane retardation (Re) are identical with those explained in the section "1. Substrate", and thus explanation is omitted here.

The above in-plane retardation (Re) value may have the wavelength dependency. For example, a mode in which the Re value is greater on the longer wavelength side than on the shorter wavelength side suffices, or a mode in which the Re value is greater on the shorter wavelength side than on the longer wavelength side suffices.

The application of the optical functional film produced by the present invention is not particularly limited, but it can be used as the optical functional film for various applications. For example, concrete applications of the optical functional film of the present invention are an optical compensator (for example, a viewing angle compensator), an elliptical polarizing plate, a luminance improving plate, etc. can be cited. Particularly, in the present invention, the optical functional film can be favorably used in an application as the negative C-plate. When the optical functional film is used as the optical compensation plate being the negative C-plate, it is favorably used in a liquid crystal display having a liquid crystal layer of the VA mode or the OCB mode.

Further, the optical functional film of the present invention can be used as a polarizing plate by bonding it to a polarizer. The polarizing plate ordinarily comprises the polarizer and films for protecting a polarizing plate formed on opposite surfaces thereof. In the present invention, since the optical functional film produced by the present invention is used as the film for protecting a polarizing plate on one side of the polarizing plate, the polarizing plate having optical compensation function for improving the viewing angle characteristics of the liquid crystal display can be obtained, for example.

Although not limited, as the above polarizer, an iodine based polarizer, a dye based polarizer using a dichromatic dye, a polyene based polarizer, etc. can be used, for example. The iodine based polarizer and the dye based polarizer are generally produced by using polyvinyl alcohol.

Furthermore, the optical functional film of the present invention may be used after being subjected to a drawing treatment. Although an embodiment of such a drawing treatment is not particularly limited, for example, an embodiment in which the optical functional film obtained by the present invention is drawn and used as a biaxial film can be given.

The present invention is not limited to the above-mentioned embodiments. The embodiments are examples and any one having the substantially same configuration as the technological idea disclosed in the claims of the present invention so as to achieve the same effects is incorporated in the technological scope of the present invention.

EXAMPLES

Hereinafter, the present invention will be explained specifically with reference to the example.

Example 1

Into cyclohexane was dissolved a compound (I) expressed by the following formula as a rodlike compound in an amount of 20 mass %, and the resultant was coated onto a substrate made of a TAC film (manufactured by FUJIFILM Corporation, Trade name: TF80UL) by bar coating in a coated amount of 2.5 g/m² after drying. Subsequently, the solvent was dried off by heating at 90° C., for 4 minutes, the rodlike compound was penetrated into the TAC film, and the rodlike compound was fixed by irradiating the coated face with ultraviolet rays, thereby producing a retardation film. The obtained retardation film was taken as a sample, and evaluated with respect to the following items.

[Chemical Formula 3]

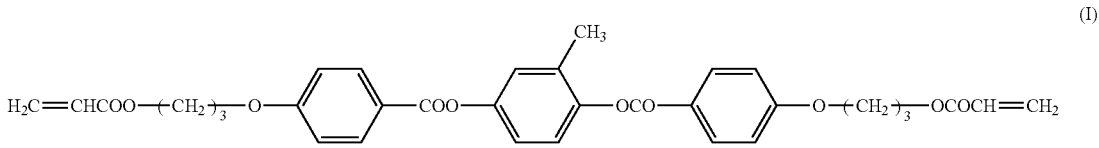

(I)

1. Random Homogeneous Alignment

With respect to the produced retardation film and the TF80UL, the Rth and the Re were measured according to the parallel Nicol rotation method by using the KOBRA-WR manufactured by Oji Scientific Instruments. The Rth and the Re of the optical functional layer were determined by subtracting the measured Rth and Re values of the TF80UL from those of the retardation film, respectively. Here, Trade name:

KOBRA-21ADH manufactured by Oji Scientific Instruments was used for the above measurements of the Re and Rth. Meanwhile, Trade name: NDH2000 manufactured by Nippon Denshoku Industries Co., Ltd. was used for the measurement of the above haze. Further, Trade name: UV-3100PC manufactured by Shimazdu Corporation was used for confirming the presence or absence of the above selective reflection wavelength. As a result, Rth=117.9 nm, and Re=0 nm. Meanwhile, the haze was 0.2%.

In addition, it was confirmed by a UV-VIS-NIR spectrophotometer (UV-3100) manufactured by Shimazdu Corporation that the retardation film has no selective reflection wavelength.

2. Adhesion Property Test

In order to examine the adhesion property, a peeling test was carried out. In the peeling test, 1 mm-square cut lines were formed on the obtained sample in a grid fashion. An adhesive tape (manufactured by NICHIBAN CO., LTD., Cellotape (registered trademark)) was bonded to a liquid crystal face, then the tape was peeled off, and observation was made by eyes. As a result, the adhesion degree was 100%.

Adhesion degree (%)=(non-peeled portion/tape-bonded area)×100.

3. Wet Heat Resistance Test-1

A sample was immersed in hot water at 90° C., for 60 minutes, and the optical characteristics and the adhesion property were measured by the above-mentioned methods. As a result, no change was seen in the optical characteristics and the adhesion property before and after the testing.

4. Wet Heat Resistance test-2

A sample was left at rest in an environment of a humidity 95% at 80° C., for 24 hours, and the optical characteristics and the adhesion property were measured by the above-mentioned methods. As a result, no change was seen in the optical characteristics and the adhesion property before and after the testing. Meanwhile, neither oozing nor clouding of the refractive index anisotropic material was seen after the testing.

5. Water Proof Test

A sample was immersed into pure water at room temperature (23.5° C.,) for one day, and the optical characteristics and the adhesion property were measured by the above-mentioned methods. As a result, no change was seen in the optical characteristics and the adhesion property before and after the testing.

6. Alkaline Resistance Test

A sample was immersed into an alkaline aqueous solution (1.5N aqueous solution of sodium hydroxide) at 55° C., for 3 minutes, and washed and dried, and the optical characteristics and the adhesion property were measured by the above-mentioned methods. As a result, no change was seen in the optical characteristics and the adhesion property before and after the testing. Furthermore, no coloring was seen.

Example 2

Into cyclohexane was dissolved the compound (I) having the formula mentioned above as the rodlike compound in an amount of 20 mass %, and the resultant was coated onto a non-drawn COP (cycloolefin polymer) film (manufactured by JSR Corporation, Trade name: ARTON) by bar coating. Subsequently, the solvent was removed by heating at 50° C., for 2 minutes, the photopolymerizable liquid crystalline compound was fixed by irradiating the coated face with ultraviolet rays, and the residual solvent was removed by further heating at 90° C., for 2 minutes, thereby producing a retardation film.

The obtained retardation film was taken as a sample, and evaluated with respect to the following items.

1. Random Homogeneous Alignment

With respect to the retardation layer of the produced retardation film, the Re, the presence or absence of the selective reflection wavelength, the Rth and the haze were evaluated. The measurements were carried out with respect to the entire retardation film and the non-drawn COP (cycloolefin polymer) film (manufactured by JSR Corporation, trade name: ARTON), respectively, and the measured values of the latter were subtracted from those of the former. Here, Trade name: KOBRA-21ADH manufactured by Oji Scientific Instruments was used for the measurement of the above Re and Rth. Meanwhile, Trade name: NDH2000 manufactured by Nippon Denshoku Industries Co., Ltd. was used for the measurement of the above haze. Further, Trade name: UV-3100PC manufactured by Shimazdu Corporation was used for confirming the presence or absence of the above selective reflection wavelength. As a result, the retardation layer of the produced retardation film had Rth=106.6 nm, Re=2.9 nm, the haze=0.04%, and no selective reflection wavelength. Thereby, in the retardation layer of the produced retardation film, it was confirmed that the above photopolymerizable liquid crystalline compound was aligned randomly and homogeneously.

2. Optical Characteristics

The retardation of a sample was measured by the automatic birefringence measuring instrument (manufactured by Oji Scientific Instruments, Trade name: KOBRA-21ADH). Measuring light was introduced vertically or obliquely to a surface of the sample, and the anisotropic property to increase the retardation of the substrate film was confirmed based on a chart of the optical retardation and the incident angle of the measuring light.

3. Haze

In order to examine the transparency of a sample, the haze value was measured by a turbidimeter (manufactured by Nippon Denshoku Industries Co., Ltd., trade name: NDH2000). The result was good with not more than 0.3% at a coated amount of 3 g/m$^2$.

4. Adhesion Property Test

In order to examine the adhesion property, a peeling test was carried out. In the peeling test, 1 mm-square cut lines were formed on the obtained sample in a grid fashion. An adhesive tape (manufactured by NICHIBAN CO., LTD., Cellotape (registered trademark)) was bonded to a liquid crystal face, then the tape was peeled off, and observation was made by eyes. As a result, the adhesion degree was 100%.

Adhesion degree (%)=(non-peeled portion/tape-bonded area)×100.

5. Wet Heat Resistance Test

A sample was immersed in hot water at 90° C., for 60 minutes, and the optical characteristics and the adhesion property were measured by the above-mentioned methods. As a result, no change was seen in the optical characteristics and the adhesion property before and after the testing.

6. Water Proof Test

A sample was immersed into pure water at room temperature (23.5° C.,) for one day, and the optical characteristics and the adhesion property were measured by the above-mentioned methods. As a result, no change was seen in the optical characteristics and the adhesion property before and after the testing.

Example 3

Into cyclohexane was dissolved a photopolymerizable liquid crystalline compound expressed by the above formula (I)

as the rodlike compound in an amount of 20 mass %, and the resultant was coated on a uniaxially drawn COP (cycloolefin polymer) film (manufactured by JSR Corporation, trade name: ARTON) by bar coating. Subsequently, the solvent was removed by heating at 50° C., for 2 minutes, the above photopolymerizable liquid crystalline compound was fixed by irradiating the coated face with ultraviolet rays, and the residual solvent was removed by further heating at 90° C., for 2 minutes, thereby producing a retardation film. The obtained retardation film was taken as a sample, and evaluated with respect to the following items.

1. Random Homogeneous Alignment

With respect to the retardation layer of the produced retardation film, the Re, the presence or absence of the selective reflection wavelength, the Rth and the haze were evaluated. The measurements were carried out with respect to the entire retardation film and the above uniaxial drawing COP (cycloolefin polymer) film (manufactured by JSR Corporation, trade name: ARTON), respectively, and the measured values of the latter were subtracted from those of the former. Here, Trade name: KOBRA-21ADH manufactured by Oji Scientific Instruments was used for the measurement of the above Re and Rth. Meanwhile, Trade name: NDH2000 manufactured by Nippon Denshoku Industries Co., Ltd. was used for the measurement of the above haze. Further, Trade name: UV-3100PC manufactured by Shimazdu Corporation was used for confirming the presence or absence of the above selective reflection wavelength. As a result, the retardation layer of the produced retardation film had Re=2.9 nm, Rth=106.6 nm, the haze=0.04%, and no selective reflection wavelength. Thereby, in the retardation layer of the produced retardation film, it was confirmed that the above photopolymerizable liquid crystalline compound was aligned randomly and homogeneously.

2. Optical Characteristics

The retardation of a sample was measured by the automatic birefringence measuring instrument (manufactured by Oji Scientific Instruments, Trade name: KOBRA-21ADH). Measuring light was introduced vertically or obliquely to a surface of the sample, and the anisotropic property to increase the retardation of the substrata film was confirmed based on a chart of the optical retardation and the incident angle of the measuring light. Moreover, the three-dimensional refractive index was measured by the same measurement device. The results are shown in the following table.

TABLE 1

| | |
|---|---|
| Nx | 1.59 |
| Ny | 1.55 |
| Nz | 1.53 |

3. Haze

In order to examine the transparency of a sample, the haze value was measured by a turbidimeter (manufactured by Nippon Denshoku Industries Co., Ltd., trade name: NDH2000). The result was good with not more than 0.3% at a coated amount of 3 g/m².

4. Adhesion Property Test

In order to examine the adhesion property, a peeling test was carried out. In the peeling test, 1mm-square cut lines were formed on the obtained sample in a grid fashion. An adhesive tape (manufactured by NICHIBAN CO., LTD., Cellotape (registered trademark)) was bonded to a liquid crystal face, then the tape was peeled off, and observation was made by eyes. As a result, the adhesion degree was 100%.

Adhesion degree (%)=(non-peeled portion/tape-bonded area)×100.

5. Wet Heat Resistance Test

A sample was immersed in hot water at 90° C., for 60 minutes, and the optical characteristics and the adhesion property were measured by the above-mentioned methods. As a result, no change was seen in the optical characteristics and the adhesion property before and after the testing.

6. Water Proof Test

A sample was immersed into pure water at room temperature (23.5° C.,) for one day, and the optical characteristics and the adhesion property were measured by the above-mentioned methods. As a result, no change was seen in the optical characteristics and the adhesion property before and after the testing.

Example 4

The compound expressed by the above formula (I) was used as /nematic liquid crystals, and dissolved in a mixed solvent of anone: isopropyl alcohol=9:1 by mass ratio in an amount of 20 mass %. A composition for forming an optical functional layer was prepared with a photopolymerization initiator (Irgacure 907, manufactured by Ciba-Geigy Japan Limited) adjusted in the resultant at 1 mass % relative to the mass of the nematic liquid crystals.

That ink composition was coated on a substrate of a triacetyl cellulose (TAC) film having a thickness of 80 μm by bar coating, which was dried at 50° C., in an oven for 2 minutes and thereafter subjected to curing by irradiation with ultraviolet rays at 100 mJ/cm² under nitrogen atmosphere, thereby forming an optical functional layer and producing an optical (compensation) film.

Example 5

An optical (compensation) film was produced by the same method as in Example 4 except that a mixed solution of anone: n-propyl alcohol=9:1 by mass ratio was used.

Example 6

An optical (compensation) film was produced by the same method as in Example 4 except that a mixed solution of anone: n-propyl alcohol=8:2 by mass ratio was used.

Comparative Example 1

An optical (compensation) film was produced by the same method as in Example 4 except that a mixed solution of anone: isopropyl alcohol=7:3 by mass ratio was used.

Comparative Example 2

An optical (compensation) film was produced by the same method as in Example 4 except that a mixed solution of anone: n-propyl alcohol=7:3 by mass ratio was used.

Comparative Example 3

The same nematic liquid crystals as used in Example 4 were dissolved in an amount of 20 mass % into a solvent consisting of anone alone. A composition for forming an optical functional layer was prepared with the photopolymerization initiator (Irgacure 907, manufactured by Ciba-Geigy Japan Limited) adjusted in the resultant at 1 mass % relative to the mass of the nematic liquid crystals. Then, an optical (compensation) film was produced in the same manner as in Example 1.

(Evaluations)

(1) Haze and Total Light Transmission (%)

The hazes and the total light transmissions of the optical (compensation) films produced in the above Examples and Comparative Examples were measured according to JIS K7361.

(2) Fringe and Clouding in a Crossed Nicol State

With respect to the optical (compensation) films produced in the Examples 4 to 6 and Comparative Examples 1 to 3, commercially available polarizing plates (HCL2-5618HCS, manufactured by SANRITZ CORPORATION) were bonded on opposite sides in a crossed Nicol arrangement, the resultant was installed on a liquid crystal-backlight, and fringe and clouding degrees at front face were visually observed and evaluated in a dark room. The Judging standard for evaluating the clouding degrees is as follows.

○: Good with no clouding observed and high transparency

X: Bad with clouding observed and decreased transparency

The above evaluation results are shown in Table 2. As shown in Table 2, the optical (compensation) films in Examples were good in terms of the haze, and the fringe and clouding in the crossed Nicol state. On the other hand, none of the optical (compensation) films in Comparative Examples were good in terms of the haze, and the fringe and clouding in the crossed Nicol state.

TABLE 2

|  | HAZE (%) | TOTAL LIGHT TRANS-MISSION (%) | FRINGE | CLOUD-ING |
|---|---|---|---|---|
| EXAMPLE 4 | 0.34 | 91.8 | ○ | ○ |
| EXAMPLE 5 | 0.34 | 91.9 | ○ | ○ |
| EXAMPLE 6 | 0.38 | 91.7 | ○ | ○ |
| COMPARATIVE EXAMPLE 1 | 1.49 | 91.9 | x | x |
| COMPARATIVE EXAMPLE 2 | 0.39 | 91.9 | x | ○ |
| COMPARATIVE EXAMPLE 3 | 0.33 | 91.8 | x | x |

What is claimed is:

1. A composition for optical functional layer comprising:
    a rodlike compound, and
    a mixed solvent containing an alcoholic solvent and another organic solvent, wherein a content of the alcoholic solvent in the mixed solvent is in a range of 5mass % to 20mass %, and the rodlike compound is insoluble in the alcoholic solvent, and
    wherein the composition is used to form an optical functional layer in which the rodlike compound forms a random homogeneous alignment.

2. The composition for optical functional layer set forth in claim 1, wherein the rodlike compound has a polymerizable functional group.

3. The composition for optical functional layer set forth in claim 1, wherein the rodlike compound is a liquid crystalline material.

4. The composition for optical functional layer set forth in claim 3, wherein the liquid crystalline material is a material exhibiting a nematic phase.

5. A producing method of an optical functional film, comprising:
    a substrate having a property as a negative C-plate, and
    the composition for optical functional layer set forth in claim 1,
    wherein the composition for optical functional layer is coated onto the substrate to produce an optical functional film comprising the substrate, and an optical functional layer formed directly on the substrate and containing the rodlike compound forming a random homogeneous alignment.

* * * * *